United States Patent
Fukami et al.

(10) Patent No.: US 7,874,279 B2
(45) Date of Patent: Jan. 25, 2011

(54) VEHICLE AND MOTOR CONTROLLER FOR VEHICLE

(75) Inventors: Yoji Fukami, Kakogawa (JP); Takeshi Nakajima, Ashiya (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 97 days.

(21) Appl. No.: 12/293,048

(22) PCT Filed: Mar. 14, 2007

(86) PCT No.: PCT/JP2007/055086
§ 371 (c)(1),
(2), (4) Date: Nov. 21, 2008

(87) PCT Pub. No.: WO2007/119360
PCT Pub. Date: Oct. 25, 2007

(65) Prior Publication Data
US 2009/0199815 A1  Aug. 13, 2009

(30) Foreign Application Priority Data
Mar. 16, 2006  (JP) .............................. 2006-073298

(51) Int. Cl.
*F02D 11/10* (2006.01)
(52) U.S. Cl. ...................... 123/399; 701/110
(58) Field of Classification Search ............. 123/399, 123/295, 296, 400; 180/65.1, 65.26, 65.29, 180/291, 220; 701/110
See application file for complete search history.

(56) References Cited

U.S. PATENT DOCUMENTS 7,457,702 B2 * 11/2008 Takamatsu .................. 701/103
2002/0104499 A1 * 8/2002 Sanada et al. ............. 123/179.3

FOREIGN PATENT DOCUMENTS

| JP | 1-74325 | 5/1989 |
| JP | 02-169825 | 6/1990 |
| JP | 02-256843 | 10/1990 |
| JP | 08-133163 | 5/1996 |
| JP | 09-166126 | 6/1997 |
| JP | 2000-108873 | 4/2000 |
| JP | 2000-213383 | 8/2000 |
| JP | 2003-090216 | 3/2003 |
| JP | 2005-006470 | 1/2005 |
| JP | 2005-061234 | 3/2005 |
| JP | 2005-278239 | 10/2005 |

OTHER PUBLICATIONS

ISA Japan; International Search Report of PCT/JP2007/055086; Jun. 19, 2007; WIPO.

* cited by examiner

*Primary Examiner*—Stephen K Cronin
*Assistant Examiner*—Johnny H Hoang
(74) *Attorney, Agent, or Firm*—Alleman Hall McCoy Russell & Tuttle LLP

(57) ABSTRACT

A motorcycle includes an engine in which angle intervals of crank angles respectively corresponding to expansion strokes of a plurality of cylinders are unequal, a motor configured to generate a torque applied to a driving power transmission system including a crankshaft of the engine, and a motor controller configured to drive the motor to add the torque of the motor to a torque of the engine.

9 Claims, 51 Drawing Sheets

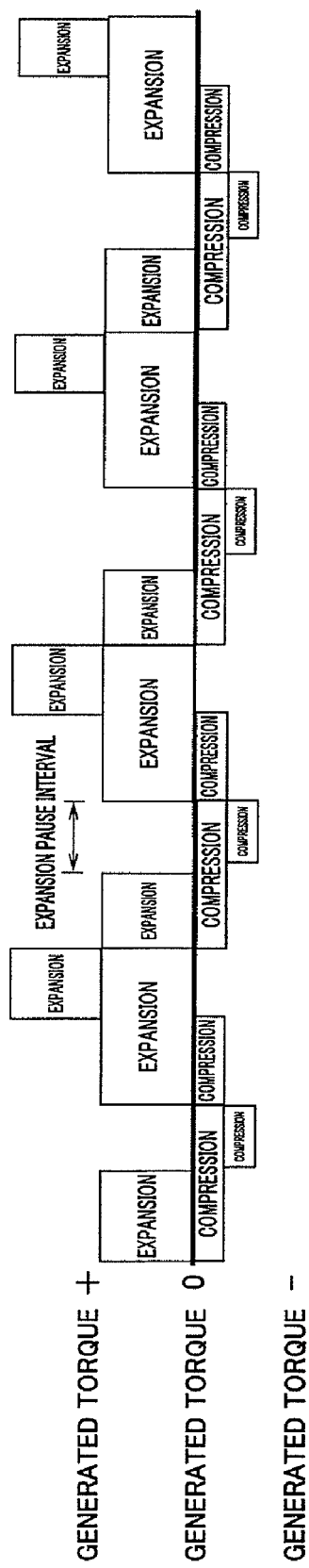

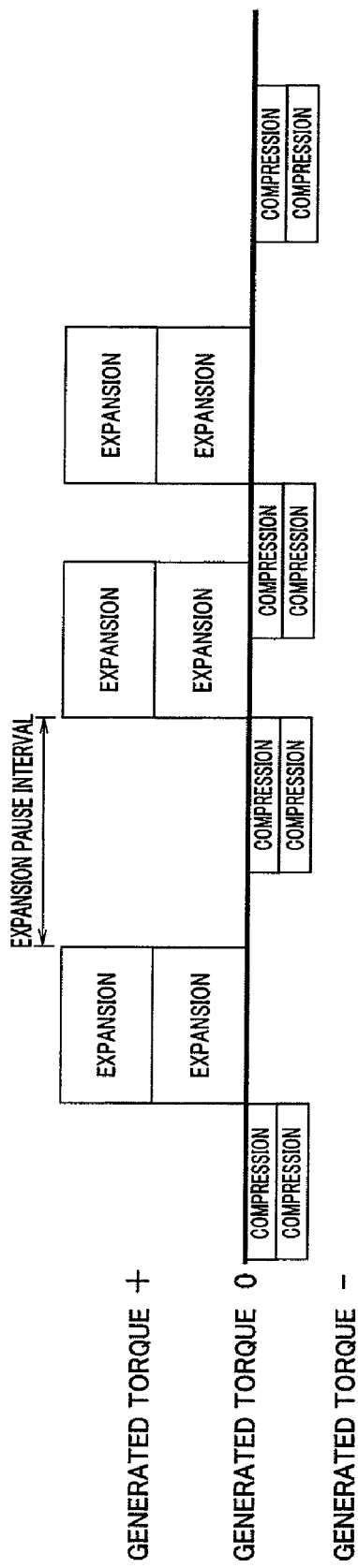

| | ENGINE FORM | DEGREE WITH WHICH NEGATIVE TORQUE IS LIKELY TO BE GENERATED | | | |
|---|---|---|---|---|---|
| | | (VERY LARGE) | (LARGE) | (MEDIUM) | (SMALL) |
| FIRST EMBODIMENT | IN-LINE FOUR CYLINDER | | ○ | | |
| SECOND EMBODIMENT | IN-LINE FOUR CYLINDER | | | | ○ |
| THIRD EMBODIMENT | IN-LINE TWO CYLINDER | | ○ | | |
| FOURTH EMBODIMENT | V-TYPE TWO CYLINDER | | ○ | | |
| FIFTH EMBODIMENT | V-TYPE TWO CYLINDER | ○ | | | |
| SIXTH EMBODIMENT | V-TYPE TWO CYLINDER | ○ | | | ○ |
| SEVENTH EMBODIMENT | V-TYPE FOUR CYLINDER | | ○ | | |
| EIGHTH EMBODIMENT | V-TYPE FOUR CYLINDER | | | | ○ |
| NINTH EMBODIMENT | V-TYPE FOUR CYLINDER | ○ | | | |
| TENTH EMBODIMENT | V-TYPE FOUR CYLINDER | | ○ | | |
| ELEVENTH EMBODIMENT | V-TYPE FOUR CYLINDER | | | ○ | |
| TWELFTH EMBODIMENT | V-TYPE FOUR CYLINDER | | | | |
| THIRTEENTH EMBODIMENT | V-TYPE FOUR CYLINDER | | | ○ | |

Fig.33

VEHICLE AND MOTOR CONTROLLER FOR VEHICLE

TECHNICAL FIELD

The present invention relates to a vehicle such as a motorcycle which is equipped with an engine configured to expand at unequal intervals and, more particularly to a motor controller configured to control a motor built into the vehicle.

BACKGROUND ART

In a multiple-cylinder engine equipped in a conventional motorcycle, typically, angles of crank angles at which expansion strokes of respective cylinders occur are set to equal intervals. A torque transmitted from the engine to a drive wheel is high in the expansion stroke in the engine and is low in other strokes (intake, compression, and exhaust). In an engine configured to expand at equal intervals, the torque in the expansion stroke is generated at equal intervals and fluctuates regularly. In the engine configured to expand at equal intervals, when the torque of the drive wheel exceeds a slip limit value with respect to a ground surface for a moment in an expansion stroke, a high torque in a next expansion stroke is generated before a gripping force with respect to the ground surface is restored, because an interval before occurrence of the next expansion stroke is short. In this situation, a slip may occur.

Accordingly, an engine has been proposed, in which expansion strokes of respective cylinders of the multiple-cylinder engine are generated at unequal intervals by, for example, arranging crank pins corresponding to the cylinders at unequal angles (see Japanese Patent Application Publication No. 3656921). As shown in FIG. 35, in the engine configured to expand at unequal intervals, an expansion pause interval with a large angle interval is provided in an interval of a crank angle (rotational phase angle of a crankshaft) of expansion strokes (region where the torque increases in FIG. 35) occurring successively. So, the expansion pause interval in which a low torque continues for a long time exists in the engine configured to expand at unequal intervals. Therefore, even if the drive wheel exceeds a slip limit with respect to a ground surface for a moment in the expansion stroke in which the generated torque is high, the gripping force of the drive wheel with respect to the ground surface is restored in the expansion pause interval. That is, by making timings when the high torque is generated irregular, traction performance of the drive wheel is improved.

DISCLOSURE OF THE INVENTION

Problems to be Solved by the Invention

However, in the engine configured to expand at unequal intervals, the torque is likely to be decreased in the expansion pause interval in which the interval between expansions is long, and the torque for executing the compression stroke insufficient in the expansion pause interval. This may sometimes generate a negative torque as shown in part A in FIG. 35. Thus, if a fluctuation including a negative value occurs in the torque from the engine, a rotational fluctuation of the engine becomes large. As a result, a vibration of a vehicle body becomes large, and driving feeling becomes worse. Typically, the rotational fluctuation can be reduced by increasing a fly wheel mass (rotational inertia mass) of the engine. This may degrade a driving power performance and driving feeling during transient driving.

Accordingly, an object of the present invention is to improve driving feeling while maintaining traction performance.

Means for Solving the Problems

The present invention has been made under the circumstances, and a vehicle of the present invention comprises an engine in which angle intervals of crank angles respectively corresponding to expansion strokes of a plurality of cylinders are unequal; and a motor configured to generate a torque applied to a driving power transmission system including a crankshaft of the engine, and a motor controller configured to drive the motor to add the torque of the motor to a torque of the engine.

In such a configuration, the torque of the motor is added to a non-uniform torque of the engine configured to expand at unequal intervals so that decrease of the torque is suppressed. As a result, an increase in a rotational fluctuation of the engine can be inhibited while maintaining high traction performance by the engine configured to expand at unequal intervals, making it possible to improve driving feeling.

The motor controller may be configured to control the motor so that a sum of the torque of the motor and the torque of the engine is maintained at a positive value.

In such a configuration, the torque of the motor is controlled so that the torque applied to the drive wheel is maintained at a positive value even when a fluctuation including a negative value is generated in the torque of the engine configured to expand at unequal intervals. Therefore, the increase in the rotational fluctuation of the engine is inhibited, and the torque is generated stably without changing its direction. As a result, driving feeling is improved.

The motor controller may be configured to execute control to drive the motor when at least one cylinder of the engine is in a compression stroke.

In such a configuration, since the torque of the motor is added in the compression stroke of the engine configured to expand at unequal intervals in which the torque is likely to be non-uniform, a decrease of the torque in the compression stroke can be suppressed.

The motor controller may be configured to execute control to cause the motor to output a constant torque according to a throttle operation amount.

In such a configuration, the decrease of the torque in the compression stroke in which the torque of the engine is likely to be decreased can be suppressed by adding the torque of the motor to the torque of the engine. In addition, since the torque of the motor may be constant when the throttle operation amount is constant, motor control is advantageously facilitated.

The motor controller may be configured to execute control so that the torque of the motor in a compression stroke in an expansion pause interval in which an angle interval of a crank angle is longest, among the angle intervals of the crank angles of the expansion strokes of the engine, is higher than the torque of the motor in other strokes.

In such a configuration, since the torque of the engine is increased at spots in the compression stroke in the expansion pause interval in which the torque of the engine is likely to be decreased, an electric power consumed for the motor is suppressed and energy saving is achieved while effectively inhibiting a significant decrease of the torque applied to the drive wheel.

The engine may be configured such that compression strokes of at least two cylinders occur simultaneously; and the motor controller may be configured to execute control so that the torque of the motor in the compression strokes occurring simultaneously is larger than the torque of the motor in the other strokes.

In such a configuration, the torque of the motor is increased at spots in the compression strokes occurring simultaneously in which the torque of the engine is likely to be decreased, an electric power consumed for the motor is suppressed and energy saving is achieved while effectively inhibiting a significant reduction of the torque applied to the drive wheel.

The motor controller may be configured to execute control to drive the motor when an engine speed of the engine is a predetermined value or lower.

In such a configuration, since the motor is driven during low-speed rotation when an inertia force is small and a fluctuation of the torque is likely to be large, driving feeling can be improved effectively. Also, when the engine speed exceeds the predetermined value, the assist control is stopped so that consumption of the electric power is suppressed. As a result, energy saving can be achieved The motor controller may stop driving of the motor when a driver is performing a throttle operation to decrease a speed of the vehicle.

In such a configuration, since the electric power consumed to drive the motor is saved, a large battery need not be built into the vehicle, making the vehicle body lightweight. It should be noted that while decreasing the vehicle speed, the motor may generate a positive torque in order to reduce an engine braking force, or otherwise may generate a negative torque in order to increase the engine braking force.

The engine may further comprise a slip detecting device configured to detect a slip of a drive wheel with respect to a ground surface; and the motor controller may be configured to decrease the torque of the motor to be lower than a value before detection of the slip when the slip detecting device detects occurrence of the slip.

In such a configuration, since the torque of the motor is decreased when the torque of the drive wheel exceeds the slip limit value and thereby the drive wheel is starting to slip on the ground surface, the torque of the drive wheel is suppressed to be smaller than the slip limit value immediately, and the gripping force of the drive wheel with respect to the ground surface can be restored.

The vehicle may further comprise a tilting sensor capable of detecting that the vehicle body is tilted rightward or leftward with respect to a driving direction of the vehicle; and the motor controller may be configured to decrease the torque of the motor when the tilting sensor detects that the vehicle body is tilted a predetermined angle or larger.

In such a configuration, since the torque of the motor is decreased when the vehicle body is tilted and thereby the gripping force of the drive wheel with respect to the ground surface is likely to be decreased, occurrence of the slip of the drive wheel with respect to the ground surface can be inhibited.

Moreover, the present invention provides a motor controller for a vehicle, which is built into the vehicle comprising an engine in which angle intervals of crank angles respectively corresponding to expansion strokes of a plurality of cylinders are unequal; and a motor configured to generate a torque applied to a driving power transmission system including a crankshaft of the engine; and the motor controller is configured to execute control to drive the motor to add the torque of the motor to a torque of the engine.

In such a configuration, the assist control is executed so that the torque of the motor is added to the torque of the engine configured to expand at unequal intervals in which the torque is likely to be non-uniform so that decrease of the torque is suppressed. As a result, the increase in the rotational fluctuation of the engine can be inhibited while maintaining high traction performance by the engine configured to expand at unequal intervals, making it possible to improve driving feeling.

BRIEF DESCRIPTION OF THE DRAWINGS

FIG. 25B is a view showing a relationship between generated torques and strokes according to the tenth embodiment;

FIG. 29B is a view showing a relationship between generated torques and strokes according to the twelfth embodiment;

FIG. 33 is a table showing comparison of degree with which a negative torque is likely to be generated, between the embodiments;

BEST MODE FOR CARRYING OUT THE INVENTION

Hereinafter, a motorcycle according to embodiments of the present invention will be described with reference to the drawings. In the embodiments described below, the directions are referenced from the perspective of a driver (not shown) mounting the motorcycle.

Embodiment 1

Figure 1:
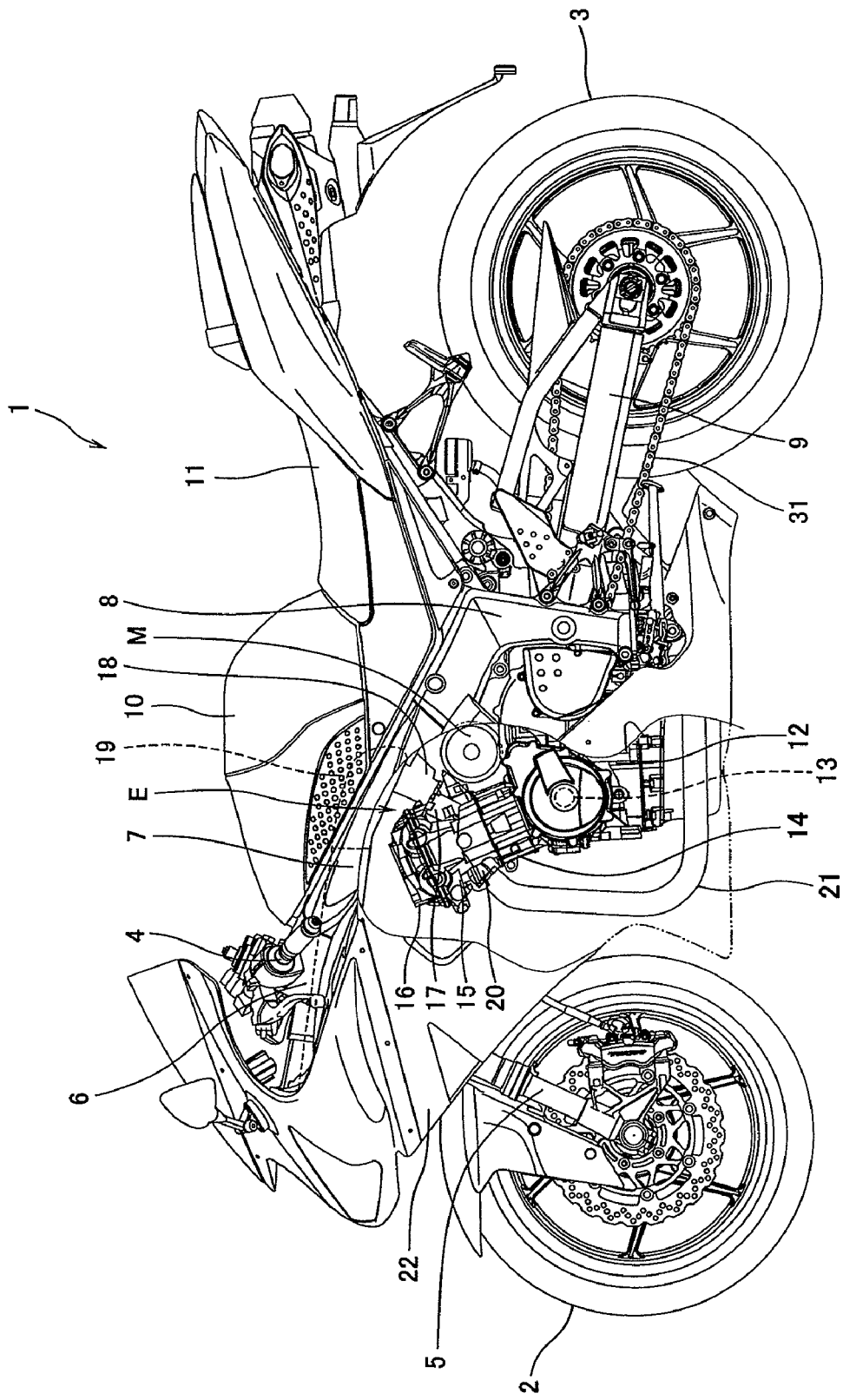
FIG. 1 is a side view showing a motorcycle according to a first embodiment of the present invention.

FIG. 1 is a side view of a motorcycle 1 according to a first embodiment of the present invention, showing a cowling 22 partly cutaway. As shown in FIG. 1, the motorcycle 1 includes a front wheel 2 and a rear wheel 3. The front wheel 2 is rotatably mounted to a lower portion of a front fork 5 extending substantially vertically. The front fork 5 is mounted on a steering shaft (not shown) by an upper bracket (not shown) attached to an upper end portion thereof, and an under bracket located below the upper bracket. The steering shaft is rotatably supported by a head pipe 6. A bar-type steering handle 4 extending rightward and leftward is attached to the upper bracket. When the driver rotates the steering handle 4 clockwise or counterclockwise, the front wheel 2 is turned to a desired direction around the steering shaft which is a rotational shaft.

A pair of right and left main frame members 7 extends rearward from the head pipe 6 to be tilted slightly in a downward direction. A pair of right and left pivot frame members 8 is coupled to rear portions of the main frame members 7. A swing arm 9 extending substantially forward and rearward is pivotally mounted at a front end portion thereof to each pivot frame member 8. The rear wheel 3, which is a drive wheel, is rotatably mounted to a rear portion of the swing arm 9. A fuel tank 10 is disposed behind the steering handle 4, and a driver straddle-seat 11 is mounted behind the fuel tank 10.

An in-line four-cylinder engine E in which cylinders are arranged in a lateral direction (rightward and leftward direction) with respect to a driving direction of the vehicle is mounted between the front wheel 2 and the rear wheel 3 such that the engine E is supported on the main frame members 7 and the pivot frame members 8. The engine E includes the crankcase 12 accommodating a crankshaft 13, a cylinder block 14 which is coupled to an upper portion of the crankcase 12 and forms in-line four cylinders, a cylinder head 15 which is coupled to an upper portion of the cylinder block 14, forms a combustion chamber together with the cylinder block 14, and is provided with a DOHC type valve system, and a cylinder head cover 16 covering an upper portion of the cylinder head 15. The engine E is substantially L-shaped in a side view by the crankcase 12 elongated horizontally and the cylinder block 14 protruding upward from a front portion of the crankcase 12. A motor M described later is disposed in a space formed behind the cylinder block 14 and above the crankcase 12.

An intake port 17 opens in a rear portion of the cylinder head 15 of the engine E. A throttle device 18 is coupled to the intake port 17 and is disposed inward of the main frame members 7. An air cleaner box 19 is disposed below the fuel tank 10 and is coupled to an upstream side of the throttle device 18. The air cleaner box 19 is configured to take in ambient air utilizing a running pressure (ram pressure) from forward. An exhaust port 20 is formed at a front portion of the cylinder head 15 to open forward and downward. An upstream end of the exhaust pipe 21 is coupled to the exhaust port 20. The exhaust pipe 21 is guided downward from the exhaust port 20 in front of the engine E, and extends rearward through a region below the engine E. A cowling 22 is provided from a front part of a vehicle body to side portions of the vehicle body so as to cover the engine E and other components. In FIG. 1, the cowling 22 is partly cutaway so that the engine E is visually observed.

Figure 2:
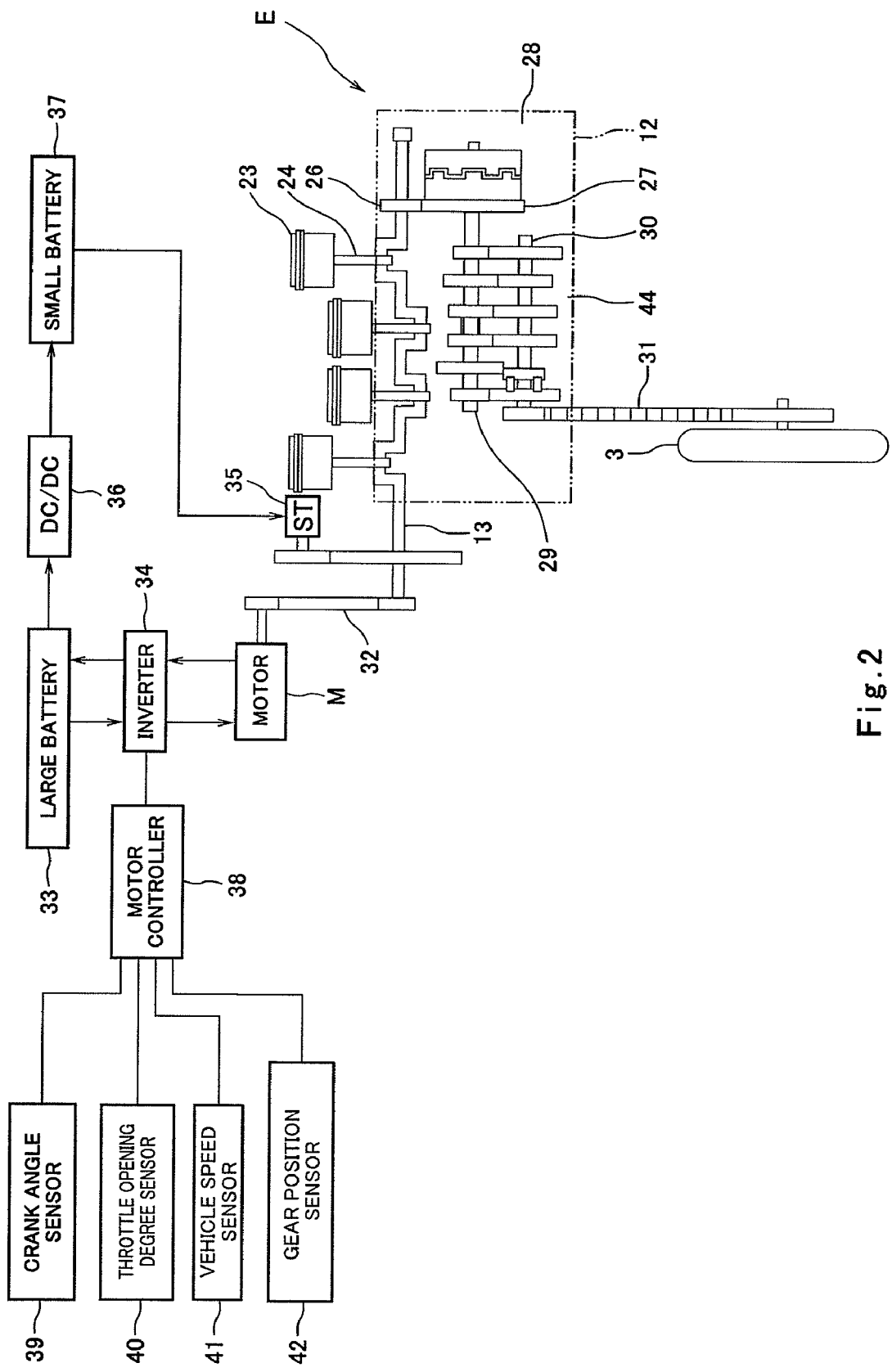
FIG. 2 is a block diagram of a driving power transmission system of the motorcycle of FIG. 1.

FIG. 2 is a block diagram of the motorcycle 1. As shown in FIG. 2, the crankcase 12 accommodates the crankshaft 13 coupled to a connecting rod 24 of a piston 23 of the engine E, and a first clutch gear 26 is mounted on one end portion of the crankshaft 13. A second clutch gear 27 is externally rotatably fitted to a main shaft 29 and is in mesh with the first clutch gear 26. In a state where a main clutch 28 is fixed to an end portion of the main shaft 29 and is coupled to the second clutch gear 27, the main shaft 29 rotates in association with the crankshaft 13. A countershaft 30 is coupled to the main shaft 29 via a gear train 44 and is able to change its speed. The countershaft 30 is coupled to the rear wheel 3 via, for example, a chain 31. As described above, a path extending from the crankshaft 13 to the rear wheel 3 via the main shaft 29, the countershaft 30, and others form a driving power transmission system.

A torque of the motor M is transmitted to an opposite end portion of the crankshaft 13 via a belt 32. The motor M is supplied with an electric power from a large battery 33 (see battery of, for example, 144V) of a large volume and a large voltage via an inverter 34. A motor controller 38 is coupled to the inverter 34 and controls driving timings and torques of the motor M.

A crank angle sensor 39 that detects a rotational angle of the crankshaft 13, a throttle opening degree sensor 40 that detects an opening degree of a throttle valve (not shown) within the throttle device 18, a vehicle speed sensor 41 that detects a vehicle speed of the motorcycle 1, and a gear position sensor 42 that detects a mesh position of the gear train 44 of the crankcase 12, are respectively coupled to the motor controller 38. In this embodiment, the crankcase 12 includes a transmission case containing the gear train 44.

The torque of a starter motor 35 is transmitted to the crankshaft 13. The starter motor 35 outputs a power smaller than that of the motor M. The starter motor 35 is driven according to an ON-operation of a starter switch (not shown) performed by the driver at start-up of the engine. The starter motor 35 is supplied with the electric power from a small battery 37 of, for example, 14V, for supplying the electric power to electric components. The small battery 37 is coupled to a large battery 33 via a DC/DC converter 36. When the electric power is generated by using the motor M as a power generator, it can be charged in the large battery 33, and the electric power accumulated in the large battery 33 is reduced in voltage by the DC/DC converter 36 and can be charged in the small battery 33.

Figure 3A:
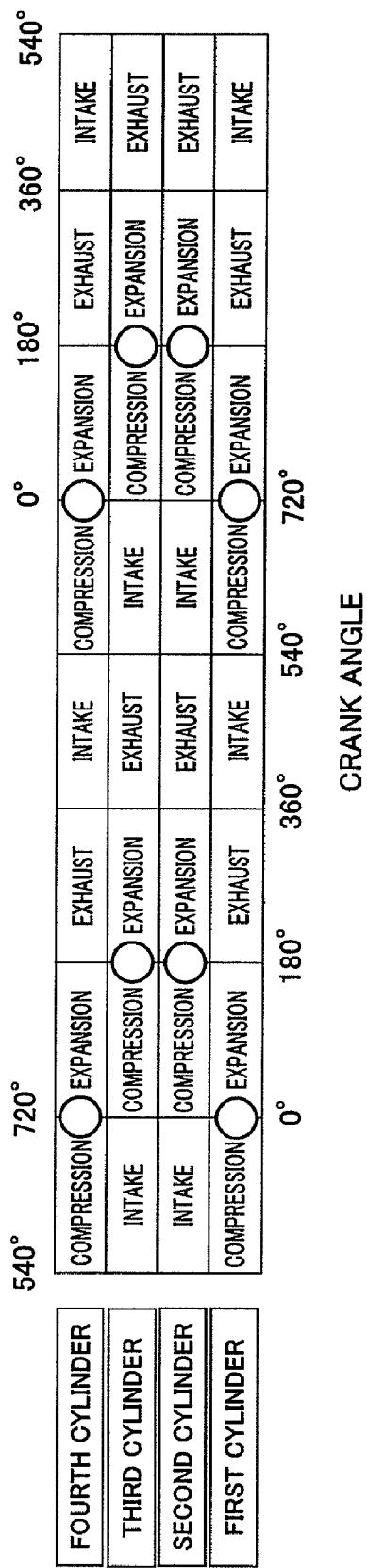
FIG. 3A is a view showing timings of expansion strokes of an in-line four-cylinder engine mounted in the motorcycle of FIG. 1.
Figure 3B:
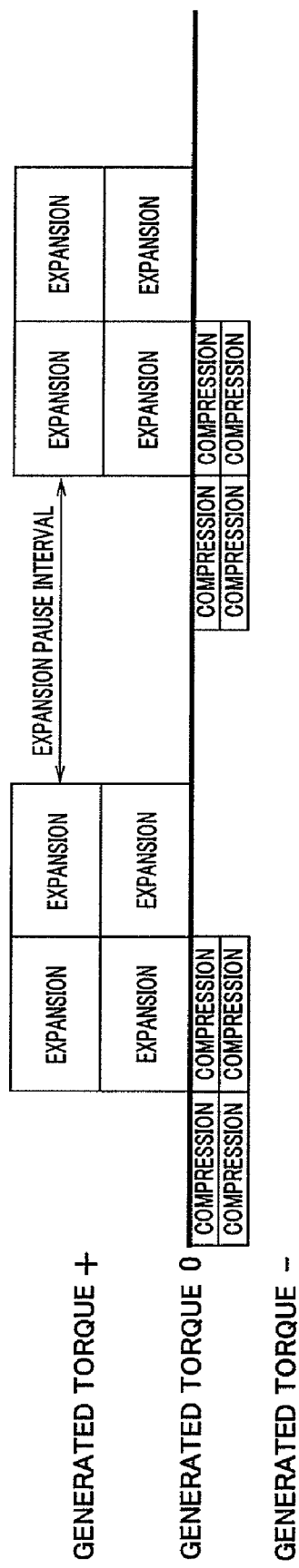
FIG. 3B is a view showing a relationship between generated torques and strokes in FIG. 3A.

FIG. 3A is a view showing timings of expansion strokes of the in-line four-cylinder engine mounted in the motorcycle of FIG. 1. FIG. 3B is a view showing a relationship between generated torques and strokes in FIG. 3A. As shown in FIGS. 3A and 3B, expansion strokes of the first cylinder and the fourth cylinder of the engine E occur at equal crank angles, and expansion strokes of the second cylinder and the third cylinder of the engine E occur at equal crank angles. The interval of the crank angle from the expansion strokes of the first cylinder and the fourth cylinder to the expansion strokes of the second cylinder and the third cylinder is 180 degrees, while the interval of the crank angle from the expansion strokes of the second cylinder and the third cylinder to the expansion strokes of the first cylinder and the fourth cylinder is 540 degrees. An expansion pause interval (360 degrees to 720 degrees) in which there are no expansion strokes is provided at an interval of crank angle of 360 degrees. In other words, the intervals at which the expansion strokes of the engine occur are set to unequal intervals.

Subsequently, a control procedure of the motor M built into the motorcycle 1 will be described. After the engine E has started and the motorcycle 1 has started driving, the motor controller 38 determines whether or not an engine speed is not higher than a predetermined value (e.g., 6000 rpm) based on information from the crank angle sensor 39. If it is determined that the engine speed is not higher than the predetermined value, the motor controller 38 further determines whether or not a throttle operation being performed by the driver is to decrease the vehicle speed of the vehicle, based on information from the crank angle sensor 39, the throttle opening degree sensor 40, the vehicle speed sensor 41, the gear position sensor 42, and others. If it is determined that the throttle operation is not to decrease the vehicle speed of the vehicle, the motor controller 38 starts assist control described below in detail.

Figure 4A:
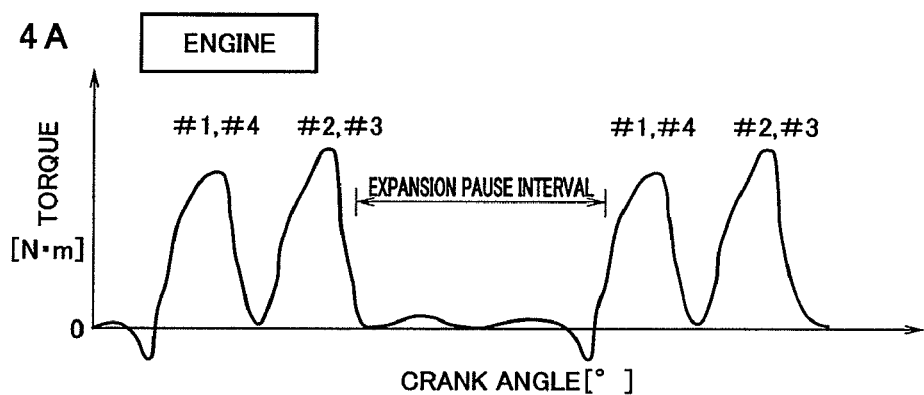
FIG. 4A is a graph showing a relationship between a torque of the engine mounted in the motorcycle of FIG. 1 and a crank angle.
Figure 4B:
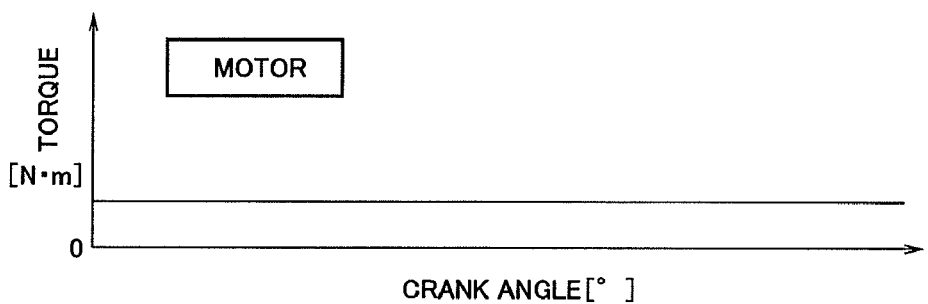
FIG. 4B is a graph showing a relationship between a torque of a motor built into the motorcycle of FIG. 1 and the crank angle.
Figure 4C:
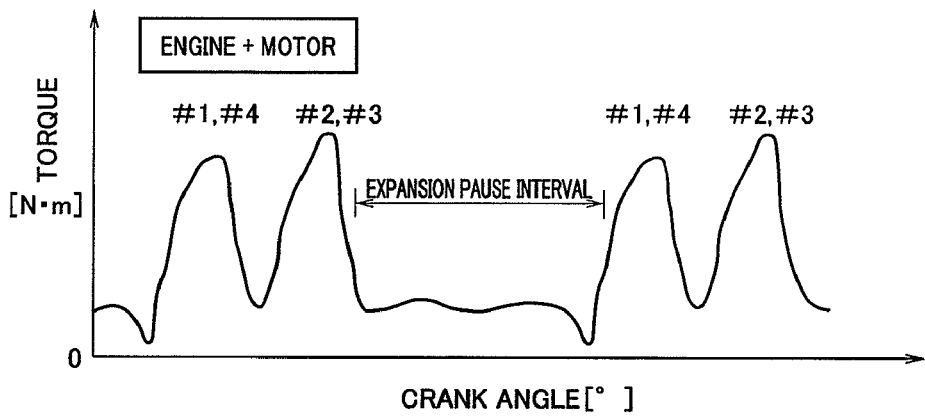
FIG. 4C is a graph showing a relationship between a torque of the engine of FIG. 4A and the motor of FIG. 4B and the crank angle.

FIG. 4A is a graph showing a relationship between the torque of the engine mounted in the motorcycle of FIG. 1, and the crank angle. FIG. 4B is a graph showing a relationship between the torque of the motor mounted in the motorcycle of FIG. 1 and the crank angle. FIG. 4C is a graph showing a relationship between the torque of the engine of FIG. 4A and the motor of FIG. 4B, and the crank angle. FIGS. 4A to 4C show that an amount of the throttle operation performed by the driver is constant. As shown in FIG. 4A, the torque of the engine E increases in value so as to correspond to the expansion strokes of the respective cylinders, and decreases in an expansion pause interval from the expansion strokes of the second cylinder and the third cylinder to the expansion strokes of the first cylinder and the fourth cylinder (in FIG. 4A, #1 indicates the first cylinder, #2 indicates the second cylinder, #3 indicates the third cylinder, and #4 indicates the fourth cylinder). Especially, in the compression strokes of the first cylinder and the fourth cylinder in the expansion pause interval, the torque has a negative value because a rotational inertia force of the crankshaft 13 is small.

Accordingly, as shown in FIG. 4B, the motor controller 38 is configured to execute control so that the motor M outputs a predetermined torque according to a throttle operation amount (throttle opening degree) (assist control). Thereby, as shown in FIG. 4C, the torque transmitted to the rear wheel 3 is maintained so that a sum of the torque of the engine E and the torque of the motor M does not have a negative value. FIGS. 4A to 4C show that the amount of throttle operation performed by the driver is constant, and therefore the torque of the motor M becomes constant. When the amount of the throttle operation changes, the torque of the motor M is controlled to have a value according to the change in the amount of throttle operation. The value of the predetermined torque may be varied according to the amount of throttle operation or may be set equal regardless of change in the amount of throttle operation. In other words, the value of the predetermined torque may be constant or variable according to change in the amount of throttle operation.

The motor controller 38 stops the above mentioned assist control if it is determined that the engine speed is not lower than a predetermined value or is decreasing.

In accordance with the above configuration, the assist control is executed so that the torque of the motor M is added to the torque of the engine E. Therefore, the torque can be maintained at a positive value even during the compression stroke in the expansion pause interval in which the torque from the engine E is likely to be decreased. As a result, an increase in a rotational fluctuation of the engine E is inhibited while maintaining high traction performance by the engine configured to expand at unequal intervals, making it possible to improve driving feeling. In addition, there is an advantage that the motor control becomes easy because the torque of the motor M may be set constant when the amount of throttle operation is constant. Furthermore, when the engine speed exceeds the predetermined value and the torque fluctuation is reduced, the assist control is stopped so that electric power consumption of the motor M is suppressed. Thus, energy saving is achieved.

ALTERNATIVE EXAMPLE 1

Figure 5A:
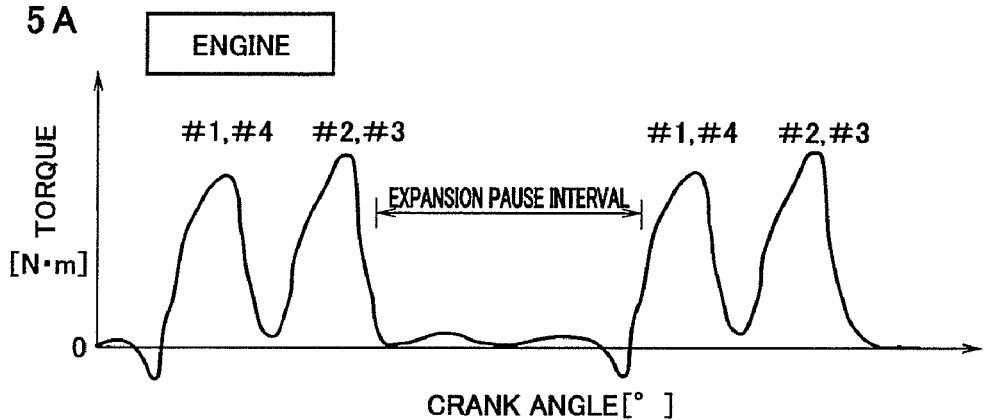
FIG. 5A is a graph showing a relationship between a torque of an engine and a crank angle according to a first alternative example.
Figure 5B:
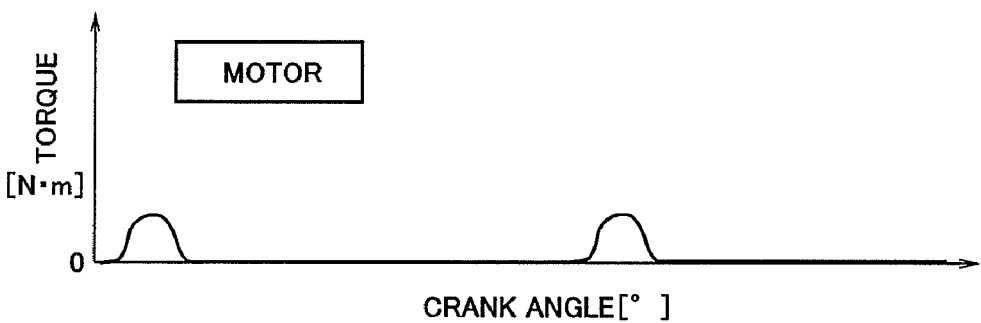
FIG. 5B is a graph showing a torque of a motor and a crank angle according to the first alternative example.
Figure 5C:
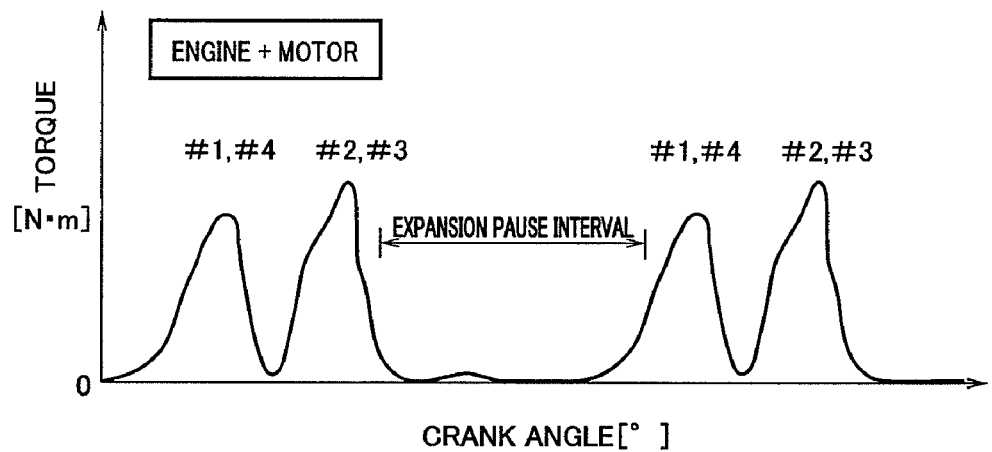
FIG. 5C is a graph showing a relationship between a torque of the engine and the motor, and the crank angle according to the first alternative example.

Subsequently, a motorcycle according to a first alternative example of the first embodiment will be described. FIG. 5A is a graph showing the relationship between the torque of the engine and the crank angle according to the first alternative example. FIG. 5B is a graph showing the relationship between the torque of the motor and the crank angle according to the first alternative example. FIG. 5C is a graph showing the relationship between the torque of the engine and the motor, and the crank angle according to the first alternative example. For easier comparison, FIG. 5A is identical to FIG. 4A. As shown in FIG. 5B, the motor controller 38 drives the motor M at spots so as to correspond to the compression strokes of the first cylinder and the fourth cylinder in the expansion pause interval so that the torque of the motor M is added to the torque of the engine E (assist control).

In the above configuration, as shown in FIG. 5C, the torque transmitted to the rear wheel 3 (FIG. 2) which is a drive wheel, is maintained so that a sum of the torque of the engine E (FIG. 2) and the torque of the motor M (FIG. 2) does not have a negative value. In addition, since the torque of the motor M (FIG. 2) is generated at spots in the compression stroke in the expansion pause interval, and the motor M (FIG. 2) is not driven in other strokes, the electric power consumed in the motor M (FIG. 2) is suppressed. Thus, energy saving is achieved.

ALTERNATIVE EXAMPLE 2

Figure 6A:
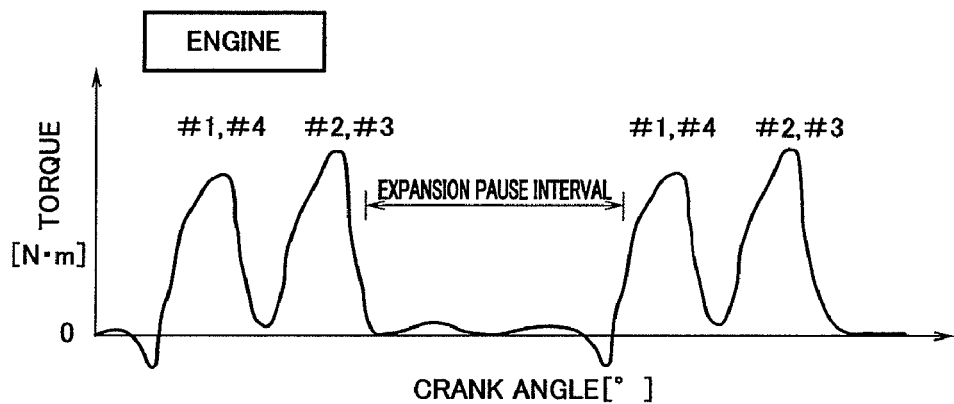
FIG. 6A is a graph showing a relationship between a torque of the engine and the crank angle according to a second alternative example.
Figure 6B:
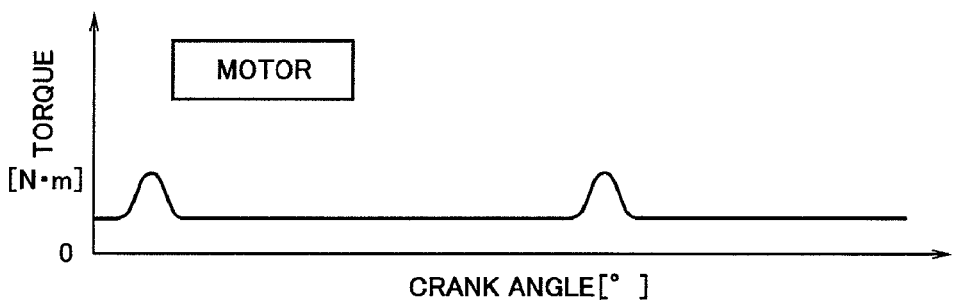
FIG. 6B is a graph showing a torque of the motor and the crank angle according to the second alternative example.
Figure 6C:
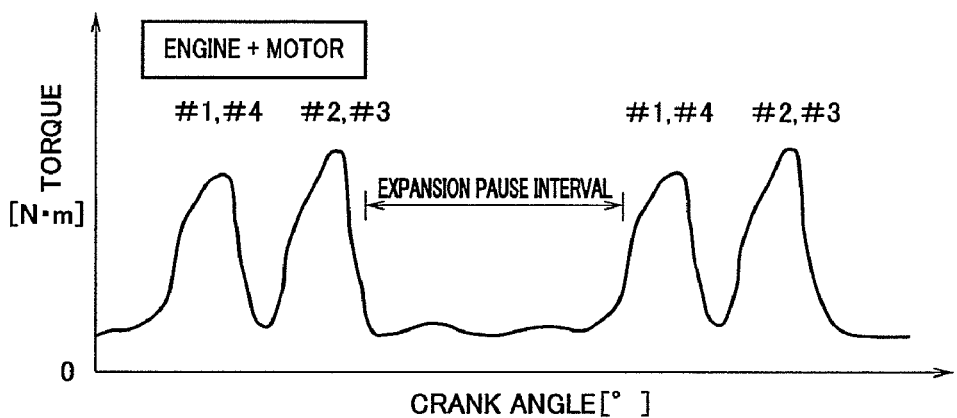
FIG. 6C is a graph showing a relationship between a torque of the engine and the motor, and the crank angle according to the second alternative example.

Subsequently, a motorcycle according to a second alternative example of the first embodiment will be described. FIG. 6A is a graph showing the relationship between the torque of the engine and the crank angle according to the second alternative example. FIG. 6B is a graph showing the relationship between the torque of the motor and the crank angle according to the second alternative example. FIG. 6C is a graph showing the relationship between the torque of the engine and the motor, and the crank angle according to the second alternative example. For easier comparison, FIG. 6A is identical to FIG. 4A. As shown in FIG. 6B, the motor controller 38 (FIG. 2) increases the torque of the motor M (FIG. 2) at spots so as to correspond to the compression strokes of the first cylinder and the fourth cylinder in the expansion pause interval and generates a constant torque according to the amount of throttle operation in other strokes. Thereby, as shown in FIG. 6C, the torque transmitted to the rear wheel 3 (FIG. 2) which is the drive wheel is maintained so that a sum of the torque of the engine E (FIG. 2) and the torque of the motor M (FIG. 2) has a positive value.

Embodiment 2

Figure 7A:
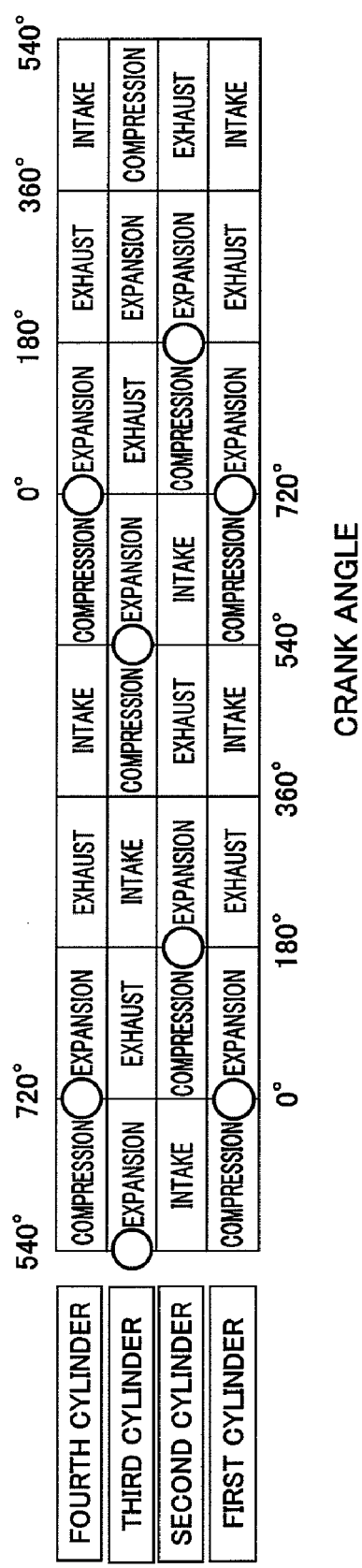
FIG. 7A is a view showing timings of expansion strokes of an in-line four-cylinder engine mounted in a motorcycle according to a second embodiment.
Figure 7B:
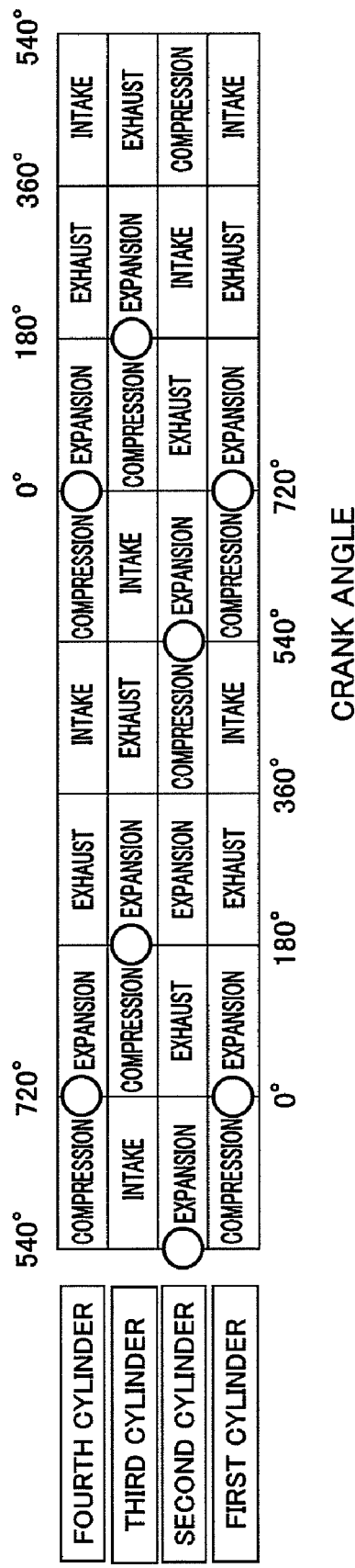
FIG. 7B is a view showing timings of expansion strokes of another in-line four-cylinder engine mounted in the motorcycle according to the second embodiment.
Figure 7C:
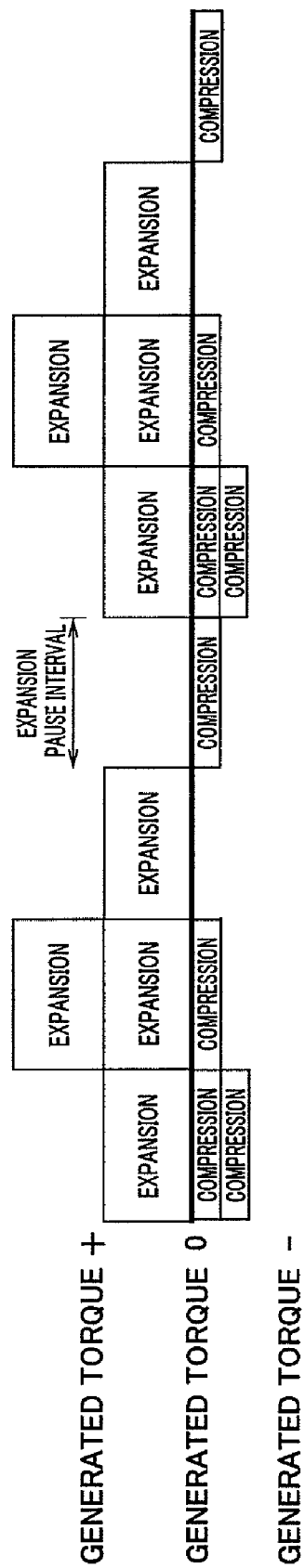
FIG. 7C is a view showing a relationship between generated torques and strokes according to the second embodiment.

FIG. 7A is a view showing timings of expansion strokes of an in-line four-cylinder engine mounted in a motorcycle according to a second embodiment. FIG. 7B is a view showing timings of expansion strokes of another in-line four-cylinder engine mounted in the motorcycle of the second embodiment. FIG. 7C is a view showing a relationship between generated torques and strokes in the second embodiment. FIG. 7A and FIG. 7B show substantially the same torque performance, which will be described collectively in this embodiment. The engine of this embodiment is mountable in the motorcycle of the first embodiment.

As shown in FIGS. 7A to 7C, in the engine of this embodiment, after the expansion stroke of only the third cylinder (or second cylinder), the expansion strokes of the first cylinder and the fourth cylinder occur simultaneously, and then the expansion stroke of only the second cylinder (or third cylinder) occurs. The expansion stroke of the third cylinder, the expansion strokes of the first and fourth cylinders, and the expansion stroke of the second cylinder occur at interval of crank angle of 180 degrees. In contrast, the interval of the crank angle from the expansion stroke of the second cylinder to the expansion stroke of the third cylinder is 360 degrees. An expansion pause interval in which there are no expansion strokes is provided at interval of crank angle of 180 degrees. In other words, the intervals at which the expansion strokes of the engine occur are set to unequal intervals.

Figure 8A:
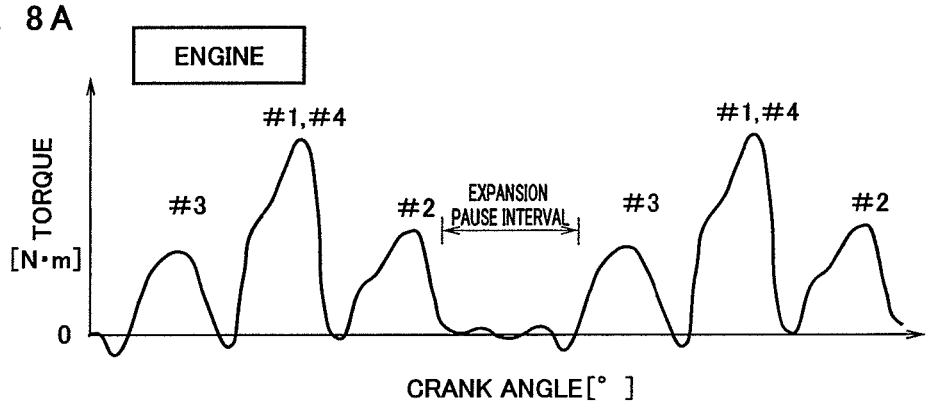
FIG. 8A is a graph showing a relationship between the torque of the engine, and the crank angle according to the second embodiment.
Figure 8B:
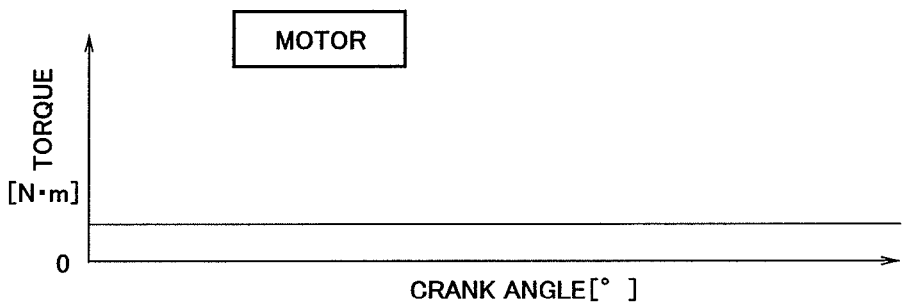
FIG. 8B is a graph showing a relationship between the torque of the motor and the crank angle according to the second embodiment.
Figure 8C:
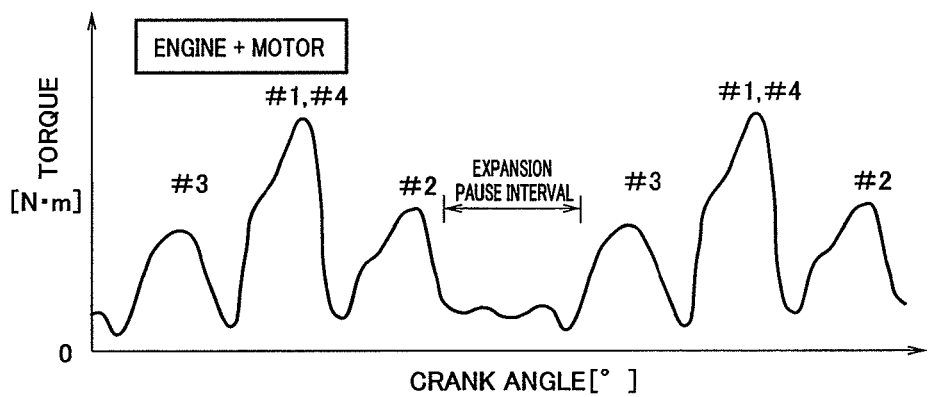
FIG. 8C is a graph showing a relationship between a torque of the engine and the motor, and the crank angle according to the second embodiment.

FIG. 8A is a graph showing a relationship between the torque of the engine and the crank angle according to the second embodiment. FIG. 8B is a graph showing a relationship between the torque of the motor and the crank angle according to the second embodiment. FIG. 8C is a graph showing a relationship between the torque of the engine and the motor, and the crank angle according to the second embodiment. As shown in FIG. 8A, the torque of the engine E increases in value so as to correspond to the expansion strokes of the respective cylinders, and decreases in an expansion pause interval from the expansion stroke of the second expansion stroke to the expansion stroke of the third cylinder. Also, since the compression strokes of the first cylinder and the fourth cylinder occur simultaneously, the torque is lower and has a negative value in their compression strokes.

Accordingly, as shown in FIG. 8B, the motor controller 38 (FIG. 2) is configured to execute control so that the motor M (FIG. 2) outputs a predetermined torque according to a throttle operation amount (assist control). Thereby, as shown in FIG. 8C, the torque transmitted to the rear wheel 3 (FIG. 2) is maintained so that a sum of the torque of the engine E (FIG. 2) and the torque of the motor M (FIG. 2) does not have a negative value. The other configuration is similar to that of the first embodiment, and will not be further described. Whereas in the second embodiment, the output of the motor is constant, the above described first alternative example and the second alternative example may be applied.

Embodiment 3

Figure 9A:
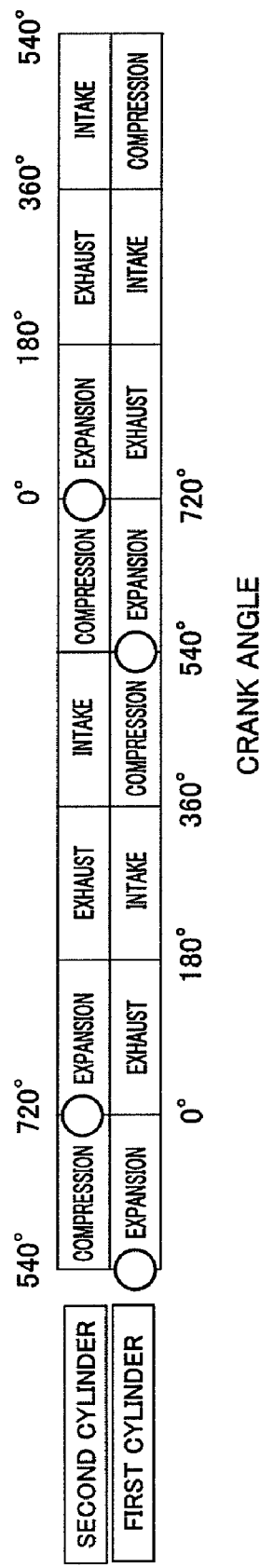
FIG. 9A is a view showing timings of expansion strokes of an in-line two-cylinder engine mounted in a motorcycle according to a third embodiment.
Figure 9B:
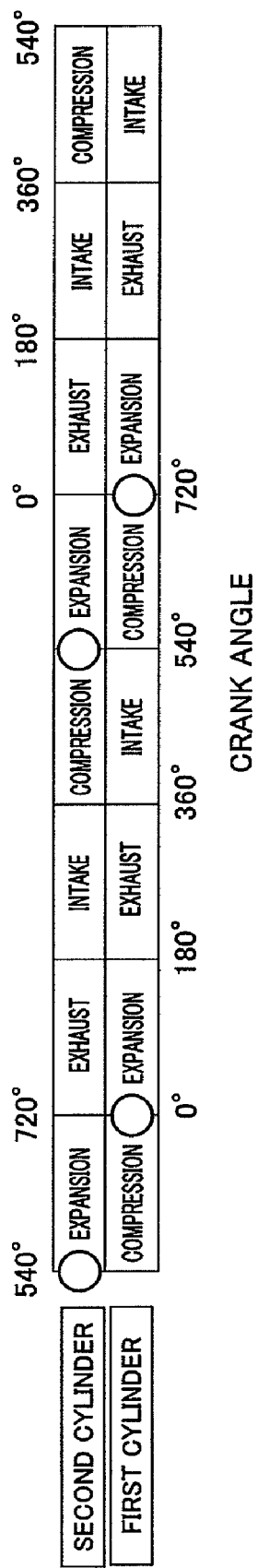
FIG. 9B is a view showing timings of expansion strokes of another in-line two-cylinder engine mounted in the motorcycle according to the third embodiment.
Figure 9C:
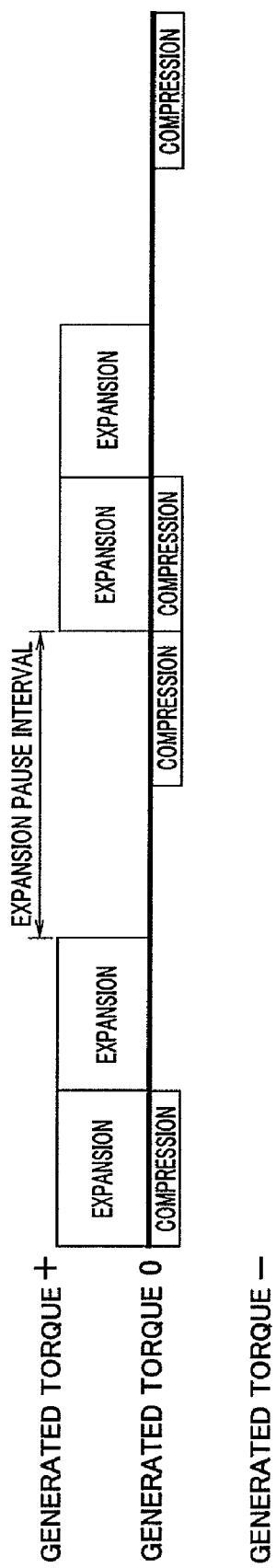
FIG. 9C is a view showing a relationship between generated torques and strokes according to the third embodiment.

FIG. 9A is a view showing timings of expansion strokes of an in-line two-cylinder engine mounted in a motorcycle according to a third embodiment. FIG. 9B is a view showing timings of expansion strokes of another in-line two-cylinder engine mounted in the motorcycle of the third embodiment. FIG. 9C is a view showing a relationship between generated torques and strokes according to the third embodiment. FIG. 9A and FIG. 9B show substantially the same torque performance, which will be described collectively in this embodiment.

As shown in FIGS. 9A to 9C, the engine of this embodiment is an in-line two-cylinder engine, and the interval of the crank angle from the expansion stroke of the first cylinder to the expansion stroke of the second cylinder is 180 degrees, while the interval of the crank angle from the expansion stroke of the second cylinder to the expansion stroke of the first cylinder is 540 degrees, and the expansion pause interval in which there are no expansion strokes is provided at interval of crank angle of 360 degrees. In other words, the intervals at which the expansion strokes of the engine occur are set to unequal intervals.

Figure 10A:
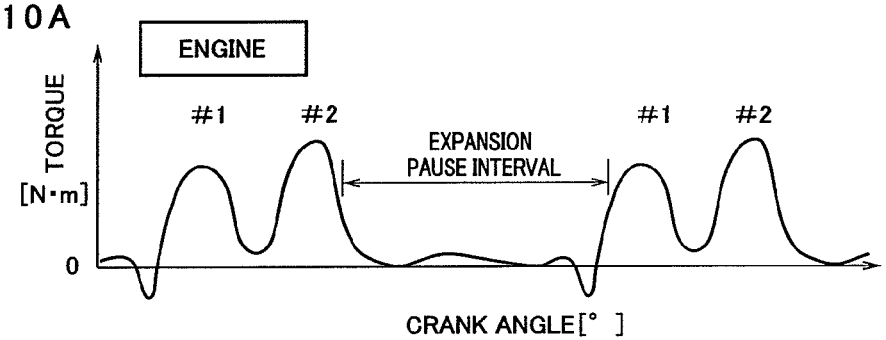
FIG. 10A is a graph showing a relationship between the torque of the engine and the crank angle according to the third embodiment.
Figure 10B:
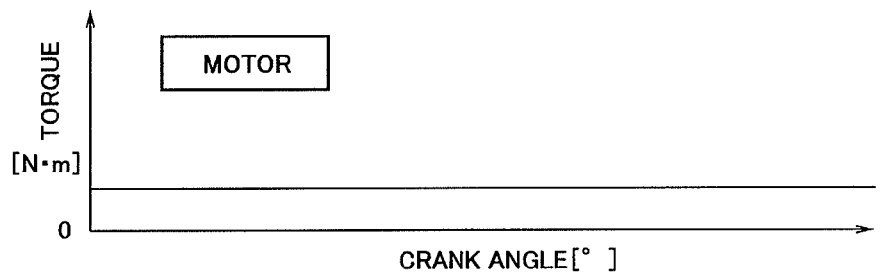
FIG. 10B is a graph showing a relationship between the torque of the motor and the crank angle according to the third embodiment.
Figure 10C:
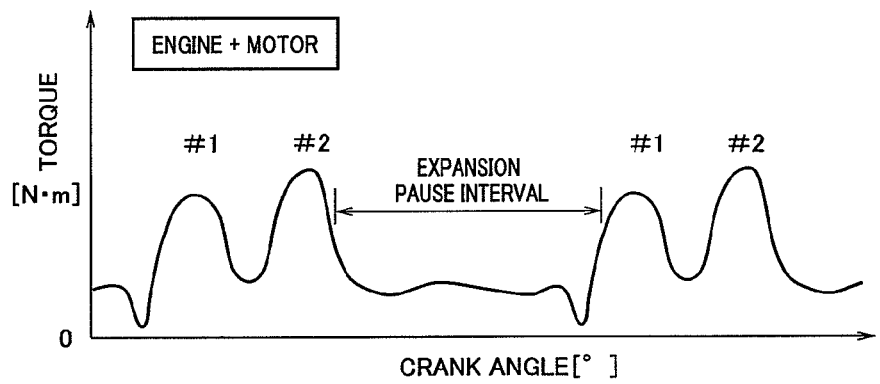
FIG. 10C is a graph showing a relationship between the torque of the engine and the motor and the crank angle according to the third embodiment.

FIG. 10A is a graph showing a relationship between the torque of the engine and the crank angle according to the third embodiment. FIG. 10B is a graph showing a relationship between the torque of the motor and the crank angle according to the third embodiment. FIG. 10C is a graph showing a relationship between the torque of the engine and the motor, and the crank angle according to the third embodiment. As shown in FIG. 10A, the torque of the engine increases in value so as to correspond to the expansion strokes of the respective cylinders, and decreases in the compression stroke in the expansion pause interval.

Accordingly, as shown in FIG. 10B, the motor controller 38 (FIG. 2) is configured to execute control so that the motor M (FIG. 2) outputs a predetermined torque according to a throttle operation amount (assist control). Thereby, as shown in FIG. 10C, the torque transmitted to the rear wheel 3 (FIG. 2) is maintained so that a sum of the torque of the engine E (FIG. 2) and the torque of the motor M (FIG. 2) does not have a negative value. The other configuration is similar to that of the first embodiment, and will not be further described. Whereas in the third embodiment, the output of the motor is constant, the above described first alternative example and the second alternative example may be applied.

Embodiment 4

Figure 11:
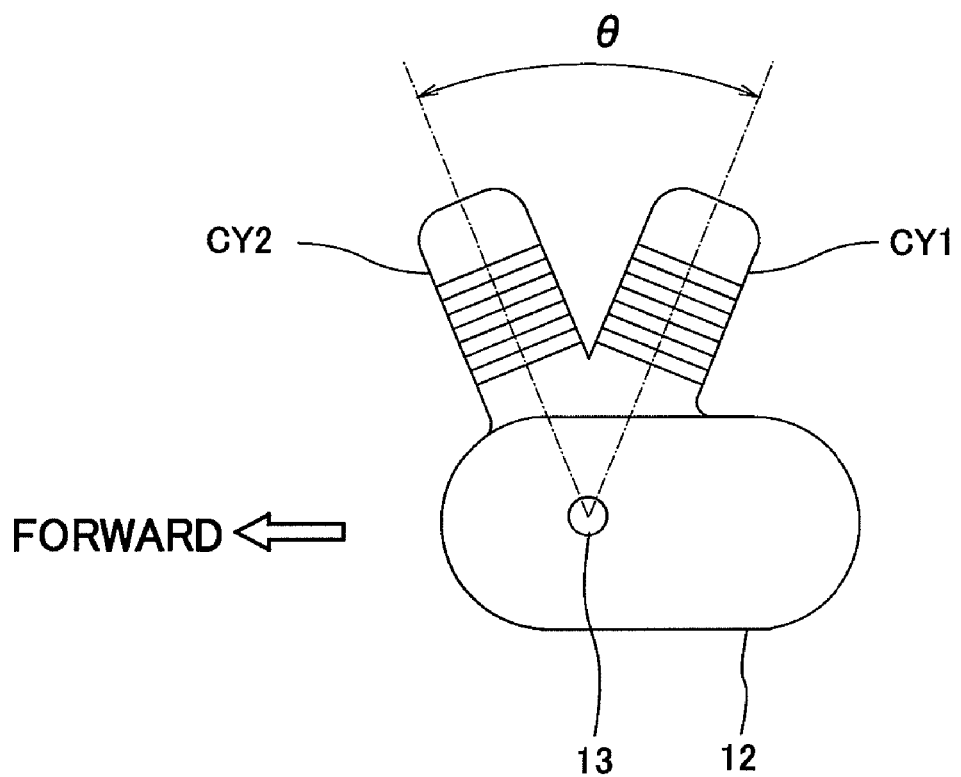
FIG. 11 is a schematic side view showing a V-type two-cylinder engine.
Figure 12A:
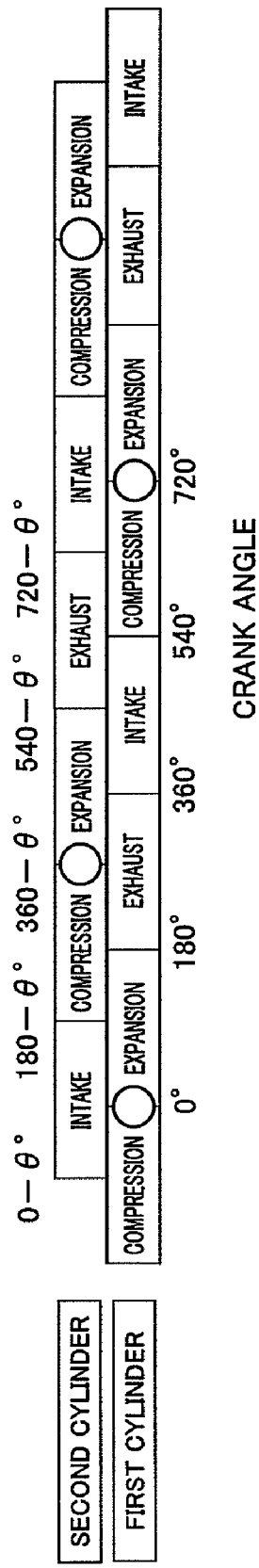
FIG. 12A is a view showing timings of expansion strokes of a V-type two-cylinder engine mounted in a motorcycle according to a fourth embodiment.
Figure 12B:
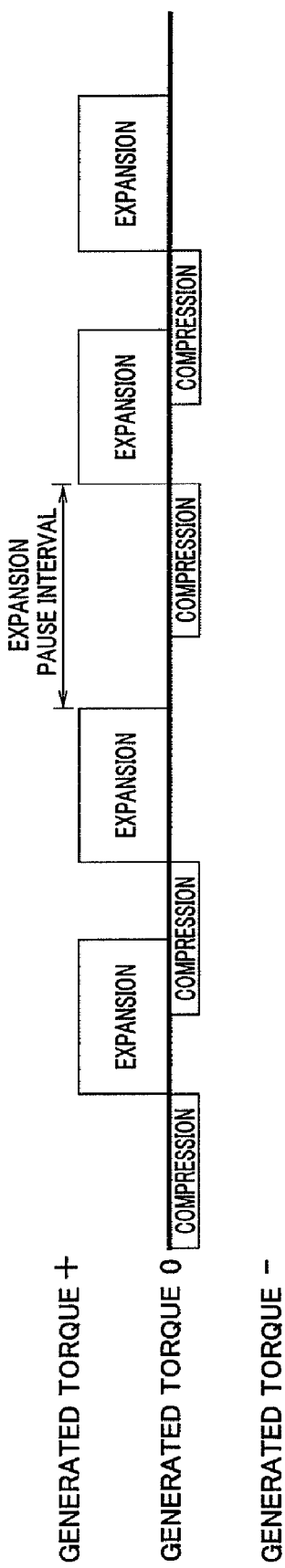
FIG. 12B is a view showing a relationship between generated torques and strokes according to the fourth embodiment.

FIG. 11 is a schematic side view showing a V-type two-cylinder engine. FIG. 12A is a view showing timings of expansion strokes of the V-type two-cylinder engine mounted in the motorcycle according to the fourth embodiment. FIG. 12B is a view showing a relationship between generated torques and strokes according to the fourth embodiment. As shown in FIG. 11, the engine of this embodiment is a V-type two-cylinder engine in which a pair of cylinders CY1 and CY2 form therebetween an open angle of θ (50 degrees to 100 degrees). As shown in FIGS. 12A and 12B, the interval of the crank angle from the expansion stroke of the first cylinder to the expansion stroke of the second cylinder is 360 degrees−θ, the interval of the crank angle from the expansion stroke of the second cylinder to the expansion stroke of the first cylinder is 360 degrees+θ, and an expansion pause interval in which non-expansion-stroke interval is long is provided at interval of 180 degrees+θ.

In other words, the intervals at which the expansion strokes of the engine occur are set to unequal intervals.

Figure 13A:
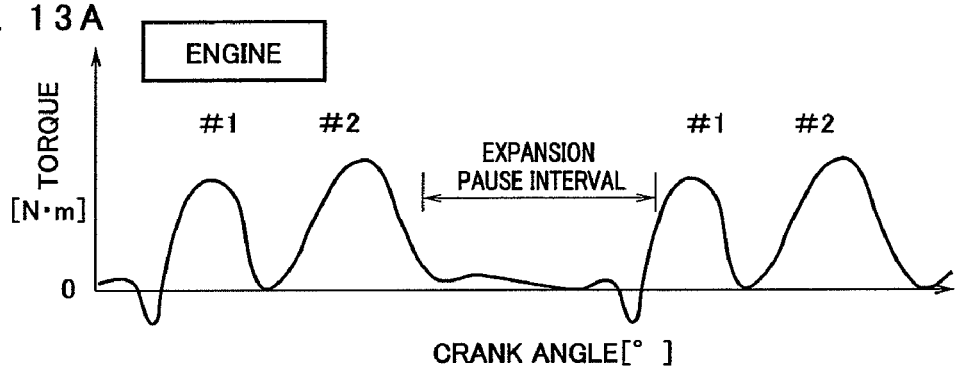
FIG. 13A is a graph showing a relationship between the torque of the engine and the crank angle according to the fourth embodiment.
Figure 13B:
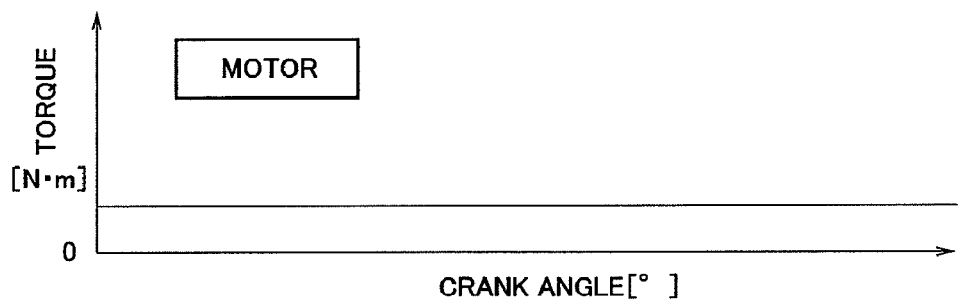
FIG. 13B is a graph showing a relationship between the torque of the motor and the crank angle according to the fourth embodiment.
Figure 13C:
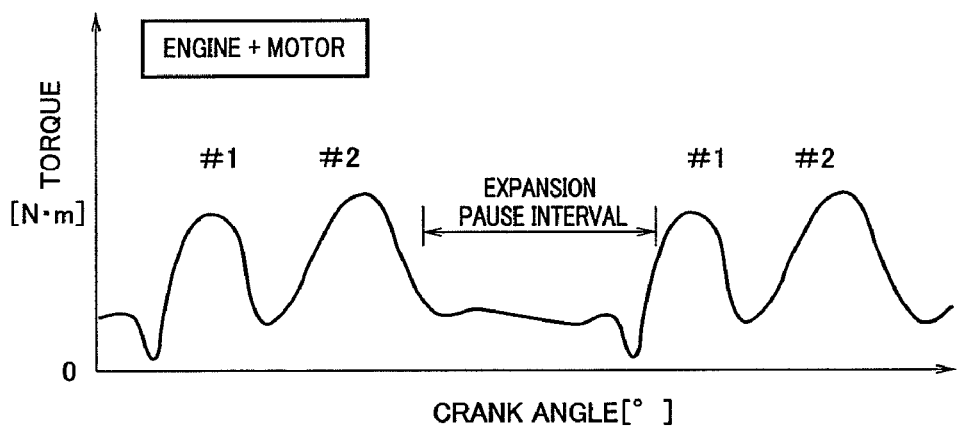
FIG. 13C is a graph showing a relationship between the torque of the engine and the motor, and the crank angle according to the fourth embodiment.

FIG. 13A is a graph showing a relationship between the torque of the engine and the crank angle according to the fourth embodiment. FIG. 13B is a graph showing a relationship between the torque of the motor and the crank angle according to the fourth embodiment. FIG. 13C is a graph showing a relationship between the torque of the engine and the motor, and the crank angle according to the fourth embodiment. As shown in FIG. 13A, the torque of the engine increases in value so as to correspond to the expansion strokes of the respective cylinders, and decreases in compression strokes in the expansion pause interval.

Accordingly, as shown in FIG. 13B, the motor controller 38 (FIG. 2) is configured to execute control so that the motor M (FIG. 2) outputs a predetermined torque according to a throttle operation amount (assist control). Thereby, as shown in FIG. 13C, the torque transmitted to the rear wheel 3 (FIG. 2) is maintained so that a sum of the torque of the engine E (FIG. 2) and the torque of the motor M (FIG. 2) does not have a negative value. The other configuration is identical to that of the first embodiment and will not be further described. Whereas in the fourth embodiment, the output of the motor is constant, the above described first alternative example and the second alternative example may be applied.

Embodiment 5

Figure 14A:
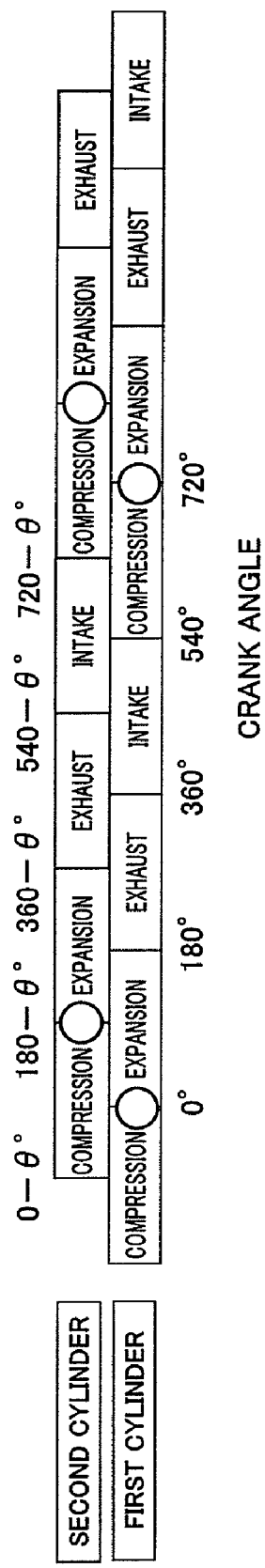
FIG. 14A is a view showing timings of expansion strokes of a V-type two-cylinder engine mounted in a motorcycle according to a fifth embodiment.
Figure 14B:
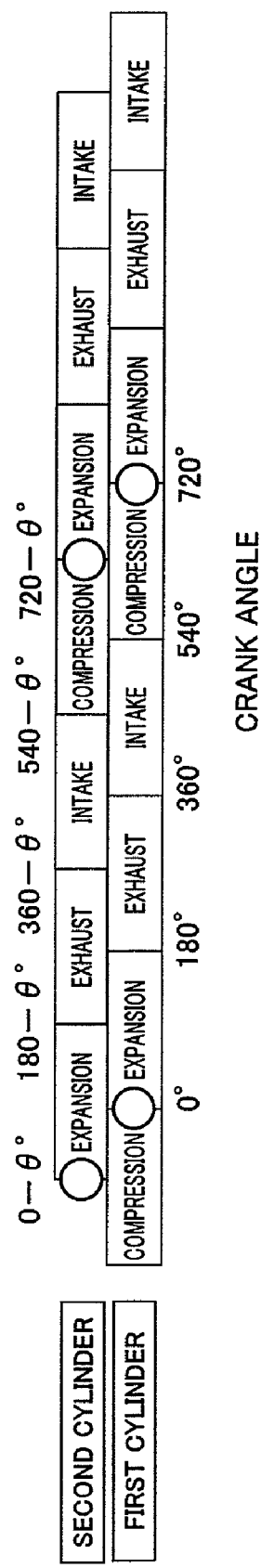
FIG. 14B is a view showing timings of expansion strokes of another V-type two-cylinder engine mounted in the motorcycle according to the fifth embodiment.
Figure 14C:
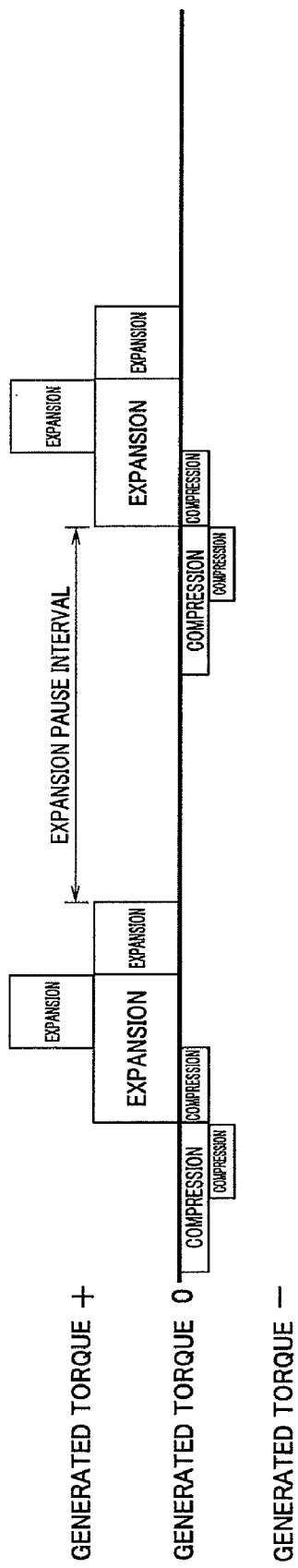
FIG. 14C is a view showing a relationship between generated torques and strokes according to the fifth embodiment.

FIG. 14A is a view showing timings of expansion strokes of a V-type two-cylinder engine mounted in a motorcycle according to a fifth embodiment, which is different from that of the fourth embodiment. FIG. 14B is a view showing timings of expansion strokes of another V-type two-cylinder engine mounted in the motorcycle according to the fifth embodiment. FIG. 14C is a view showing a relationship between generated torques and strokes according to the fifth embodiment. FIG. 14A and FIG. 14B show substantially the same torque performance, which will be described collectively in this embodiment.

As shown in FIGS. 14A to 14C, the engine of this embodiment is a V-type two-cylinder engine in which a pair of cylinders form therebetween an open angle θ (50 degrees to 100 degrees). Also, the interval of the crank angle from the expansion stroke of the first cylinder to the expansion stroke of the second cylinder is θ, the interval of the crank angle from the expansion stroke of the second cylinder to the expansion stroke of the first cylinder is 540 degrees+θ, an expansion pause interval in which there are no expansion strokes is provided at interval of crank angle of 540 degrees−θ. In other words, the intervals at which the expansion strokes of the engine occur are set to unequal intervals.

Figure 15A:
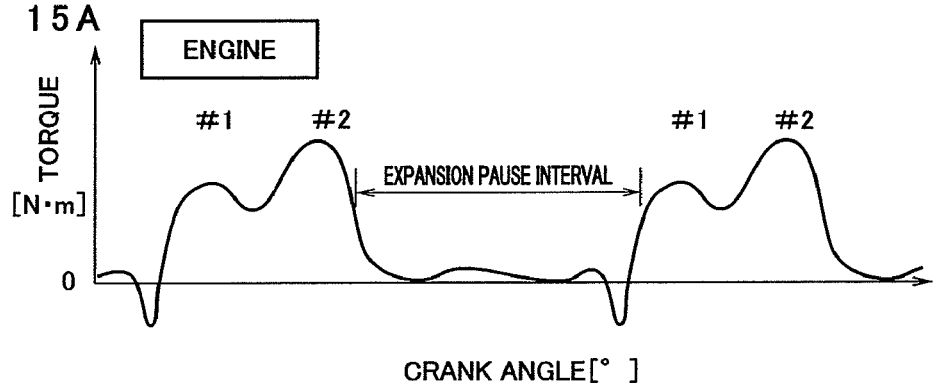
FIG. 15A is a graph showing a relationship between the torque of the engine and the crank angle according to the fifth embodiment.
Figure 15B:
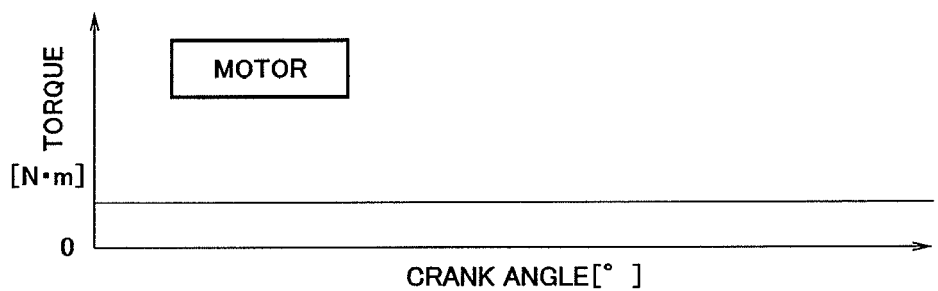
FIG. 15B is a graph showing a relationship between the torque of the motor and the crank angle according to the fifth embodiment.
Figure 15C:
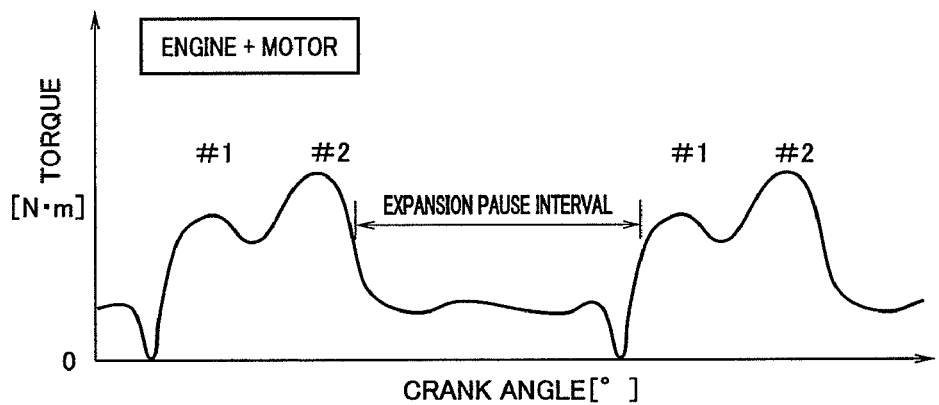
FIG. 15C is a graph showing a relationship between the torque of the engine and the motor, and the crank angle according to the fifth embodiment.

FIG. 15A is a graph showing a relationship between the torque of the engine and the crank angle according to the fifth embodiment. FIG. 15B is a graph showing a relationship between the torque of the motor and the crank angle according to the fifth embodiment. FIG. 15C is a graph showing a relationship between the torque of the engine and the motor, and the crank angle according to the fifth embodiment. As shown in FIG. 15A, the torque of the engine increases in value so as to correspond to the expansion strokes of the respective cylinders, and decreases in compression strokes in the expansion pause interval.

Accordingly, as shown in FIG. 15B, the motor controller 38 (FIG. 2) is configured to execute control so that the motor M (FIG. 2) outputs a predetermined torque according to the throttle operation amount (assist control). Thereby, as shown in FIG. 13C, the torque transmitted to the rear wheel 3 (FIG. 2) is maintained so that a sum of the torque of the engine E (FIG. 2) and the torque of the motor M (FIG. 2) does not have a negative value. The other configuration is identical to that of the first embodiment and will not be further described. Whereas in the fifth embodiment, the motor output is constant, the above described first alternative example and the second alternative example may be applied.

Embodiment 6

Figure 16A:
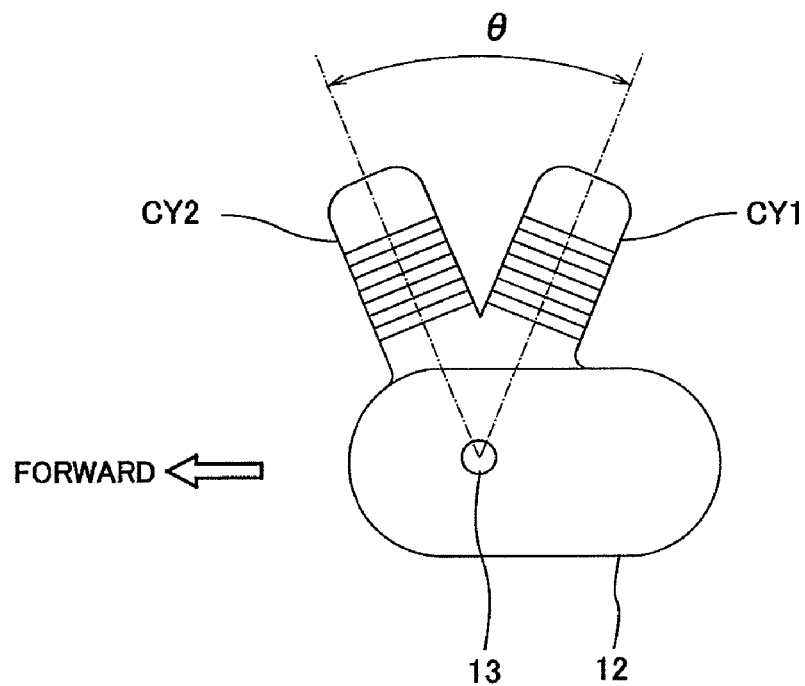
FIG. 16A is a schematic side view showing a V-type four-cylinder engine.
Figure 16B:
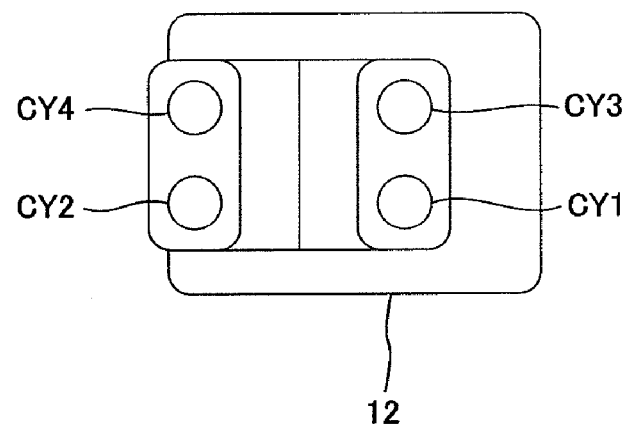
FIG. 16B is a schematic plan view showing the V-type four-cylinder engine.
Figure 17A:
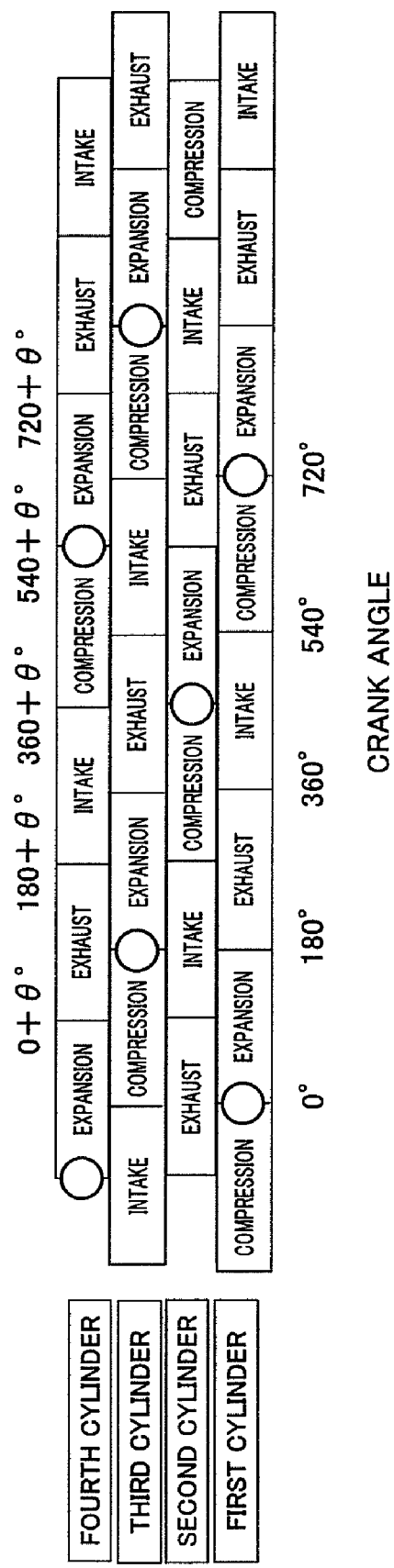
FIG. 17A is a view showing timings of expansion strokes of a V-type four-cylinder engine mounted in a motorcycle according to a sixth embodiment.
Figure 17B:
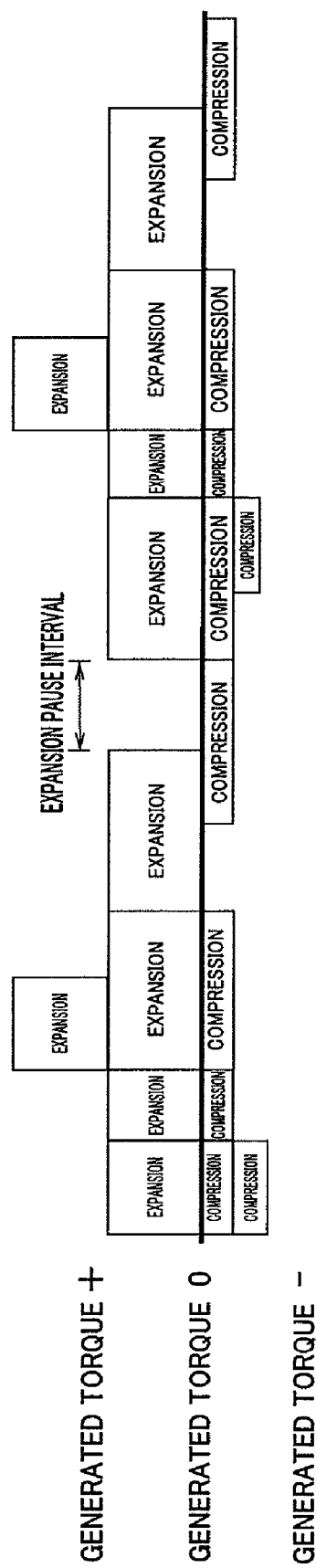
FIG. 17B is a view showing a relationship between generated torques and strokes according to the sixth embodiment.

FIG. 16A is a schematic side view showing a V-type four-cylinder engine. FIG. 16B is a schematic plan view showing the V-type four-cylinder engine. FIG. 17A is a view showing timings of expansion strokes of the V-type four-cylinder engine mounted in the motorcycle of a sixth embodiment. FIG. 17B is a view showing a relationship between generated torques and strokes according to the sixth embodiment. As shown in FIGS. 16A and 16B, the engine of this embodiment is a V-type four-cylinder engine in which the first cylinder CY1 and the third cylinder CY3 form an open angle of θ (50 degrees to 100 degrees), and the second cylinder CY2 and the fourth cylinder CY4 form an open angle of θ (50 degrees to 100 degrees). As shown in FIGS. 17A and 17B, the interval of the crank angle from the expansion stroke of the first cylinder to the expansion stroke of the third cylinder is 180 degrees, the interval of the crank angle from the expansion stroke of the third cylinder to the expansion stroke of the second cylinder is 360 degrees−θ, the interval of the crank angle from the expansion stroke of the second cylinder to the expansion stroke of the fourth cylinder is 180 degrees, the interval of the crank angle from the expansion stroke of the fourth cylinder to the expansion stroke of the first cylinder is θ, and the expansion pause interval in which there are no expansion strokes is provided at interval of crank angle θ. In other words, the intervals at which the expansion strokes of the engine occur are set to unequal intervals.

Figure 18A:
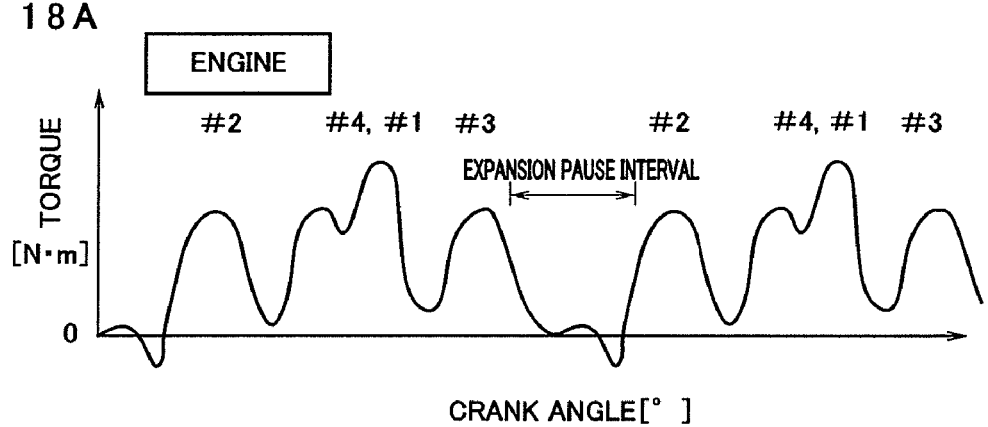
FIG. 18A is a graph showing a relationship between the torque of the engine and the crank angle according to the sixth embodiment.
Figure 18B:
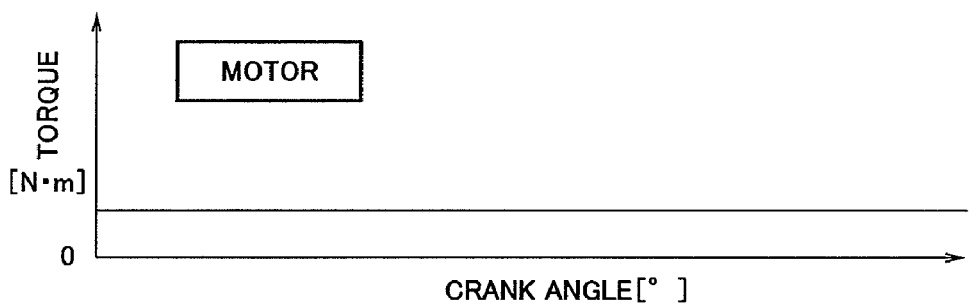
FIG. 18B is a graph showing a relationship between the torque of the motor and the crank angle according to the sixth embodiment.
Figure 18C:
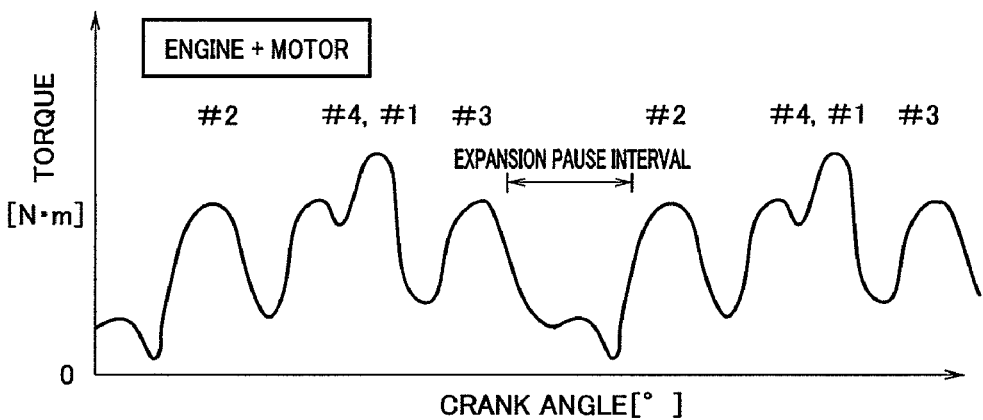
FIG. 18C is a graph showing a relationship between the torque of the engine and the motor, and the crank angle according to the sixth embodiment.

FIG. 18A is a graph showing a relationship between the torque of the engine and the crank angle according to the sixth embodiment. FIG. 18B is a graph showing a relationship between the torque of the motor and the crank angle according to the sixth embodiment. FIG. 18C is a graph showing a relationship between the torque of the engine and the motor and the crank angle according to the sixth embodiment. As shown in FIG. 18A, the torque of the engine increases in value so as to correspond to the expansion strokes of the respective cylinders, and decreases in compression strokes in expansion pause interval.

Accordingly, as shown in FIG. 18B, the motor controller 38 (FIG. 2) is configured to execute control so that the motor M (FIG. 2) outputs a predetermined torque according to the throttle operation amount (assist control). Thereby, as shown in FIG. 18C, the torque transmitted to the rear wheel 3 (FIG. 2) is maintained so that a sum of the torque of the engine E (FIG. 2) and the torque of the motor M (FIG. 2) does not have a negative value. The other configuration is identical to that of the first embodiment and will not be further described. Whereas in the sixth embodiment, the motor output is constant, the above described first alternative example and second alternative example may be applied.

Embodiment 7

Figure 19A:
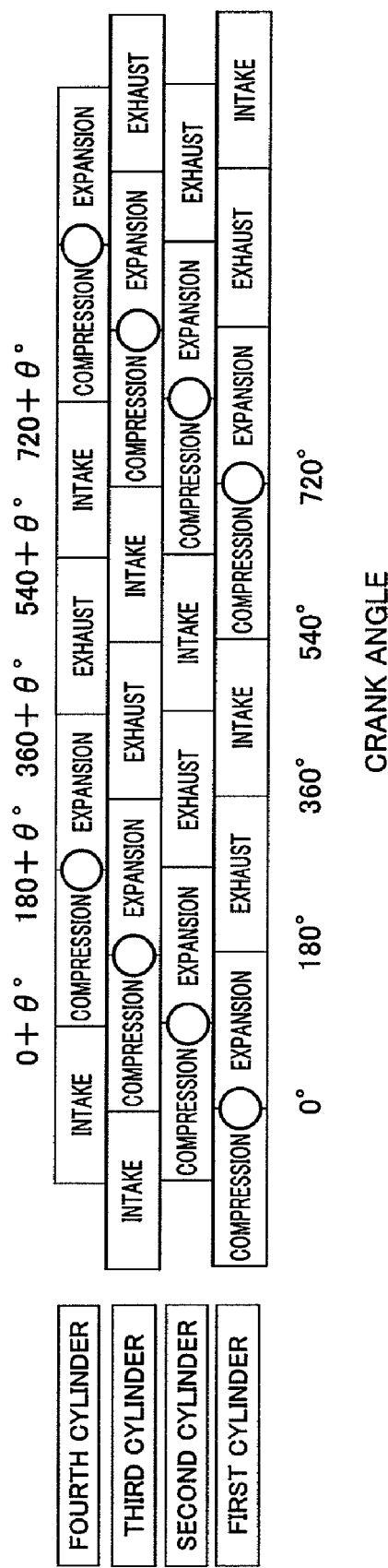
FIG. 19A is a view showing timings of expansion strokes of a V-type four-cylinder engine mounted in a motorcycle according to a seventh embodiment.
Figure 19B:
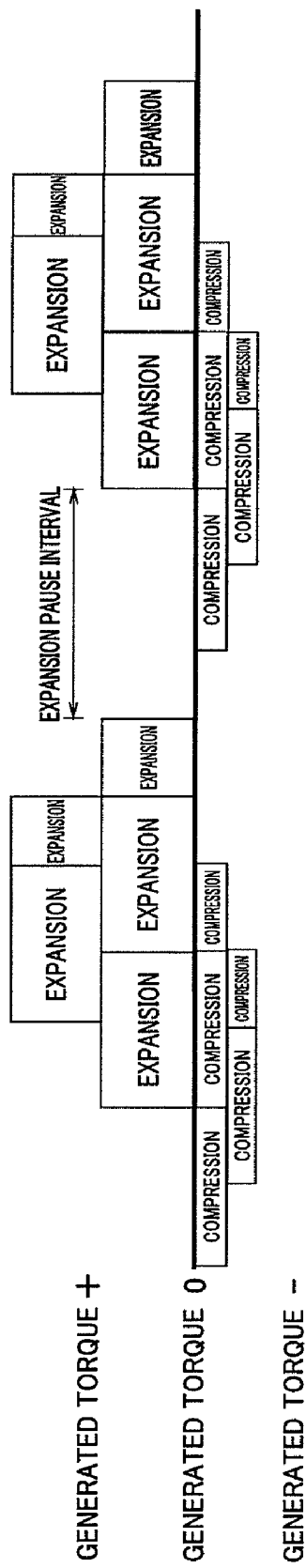
FIG. 19B is a view showing a relationship between generated torques and strokes according to the seventh embodiment.

FIG. 19A is a view showing timings of expansion strokes of a V-type four-cylinder engine which is mounted in a motorcycle of a seventh embodiment and has expansion strokes different from those of FIG. 17A. FIG. 19B is a view showing a relationship between generated torques and strokes according to the seventh embodiment. As shown in FIGS. 19A and 19B, the engine of this embodiment is a V-type four-cylinder engine in which the first cylinder and the third cylinder form an open angle of θ (50 degrees to 100 degrees) and the second cylinder and the fourth cylinder form an open angle of θ (50 degrees to 100 degrees). The interval of the crank angle from the expansion stroke of the first cylinder to the expansion stroke of the second cylinder is 180 degrees−θ, the interval of the crank angle from the expansion stroke of the second cylinder to the expansion stroke of the third cylinder is θ, the interval of the crank angle from the expansion stroke of the third cylinder to the expansion stroke of the fourth cylinder is 180 degrees−θ, the interval of the crank angle from the expansion stroke of the fourth cylinder to the expansion stroke of the first cylinder is 360 degrees+θ, and the expansion pause interval in which there are no expansion strokes is provided at interval of crank angle of 360 degrees+θ. In other words, the intervals at which the expansion strokes of the engine occur are set to unequal intervals.

Figure 20A:
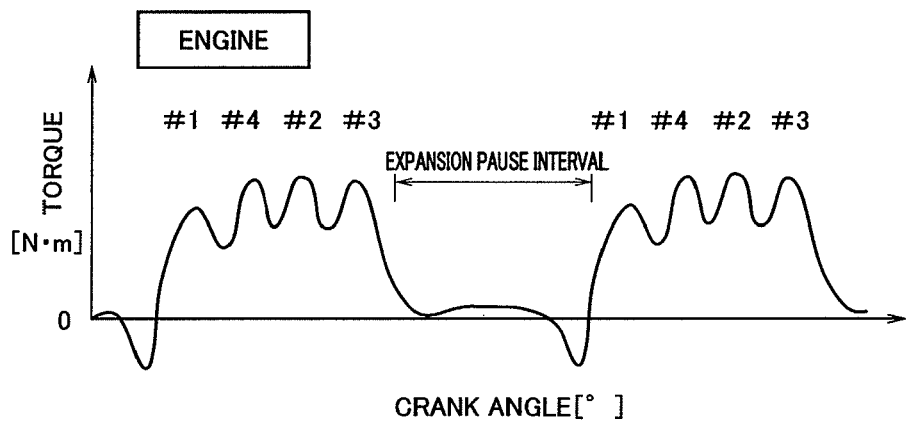
FIG. 20A is a graph showing a relationship between the torque of the engine and the crank angle according to the seventh embodiment.
Figure 20B:
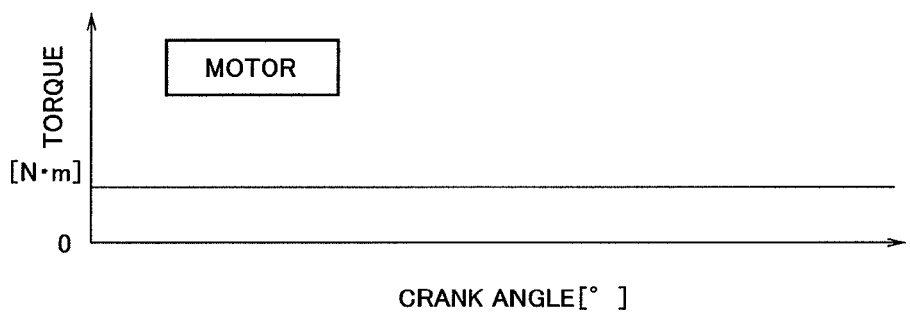
FIG. 20B is a graph showing a relationship between the torque of the motor and the crank angle according to the seventh embodiment.
Figure 20C:
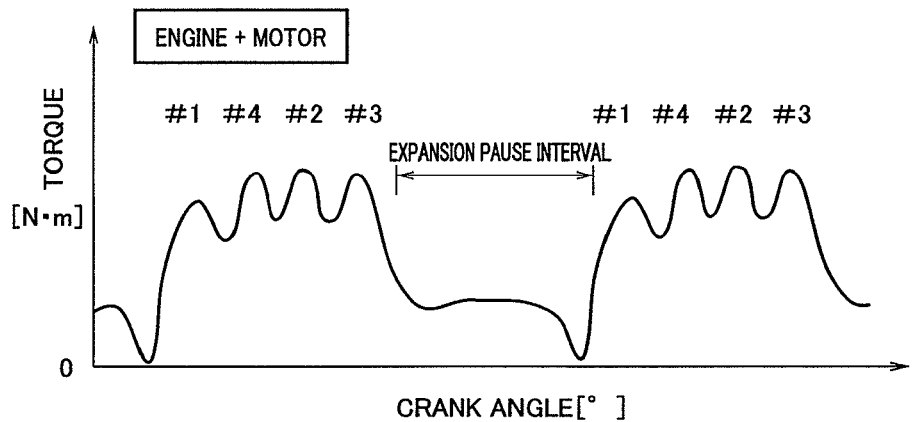
FIG. 20C is a graph showing a relationship between the torque of the engine and the motor and the crank angle according to the seventh embodiment.

FIG. 20A is a graph showing a relationship between the torque of the engine and the crank angle according to the seventh embodiment. FIG. 20B is a graph showing a relationship between the torque of the motor and the crank angle according to the seventh embodiment. FIG. 20C is a graph showing a relationship between the torque of the engine and the motor, and the crank angle according to the seventh embodiment. As shown in FIG. 20A, the torque of the engine increases in value so as to correspond to the expansion strokes of the respective cylinders, and decreases in compression strokes in expansion pause interval.

Accordingly, as shown in FIG. 20B, the motor controller 38 (FIG. 2) is configured to execute control so that the motor M (FIG. 2) outputs a predetermined torque according to the throttle operation amount (assist control). Thereby, as shown in FIG. 20C, the torque transmitted to the rear wheel 3 (FIG. 2) is maintained so that a sum of the torque of the engine E (FIG. 2) and the torque of the motor M (FIG. 2) does not have a negative value. The other configuration is identical to that of the first embodiment and will not be further described. Whereas in the seventh embodiment, the motor output is constant, the above described first alternative example and second alternative example may be applied.

Embodiment 8

Figure 21A:
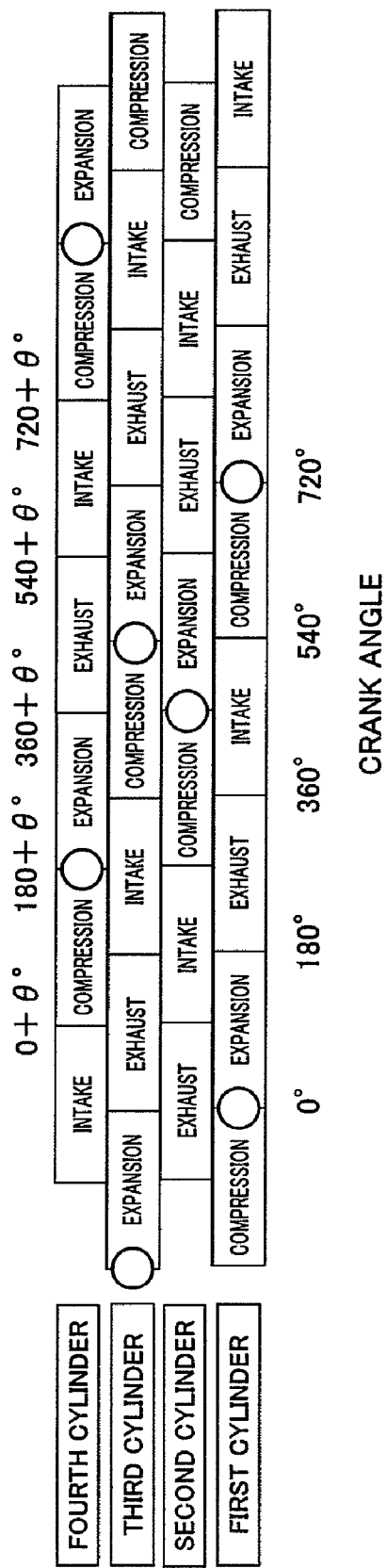
FIG. 21A is a view showing timings of expansion strokes of a V-type four-cylinder engine mounted in a motorcycle according to an eighth embodiment.
Figure 21B:
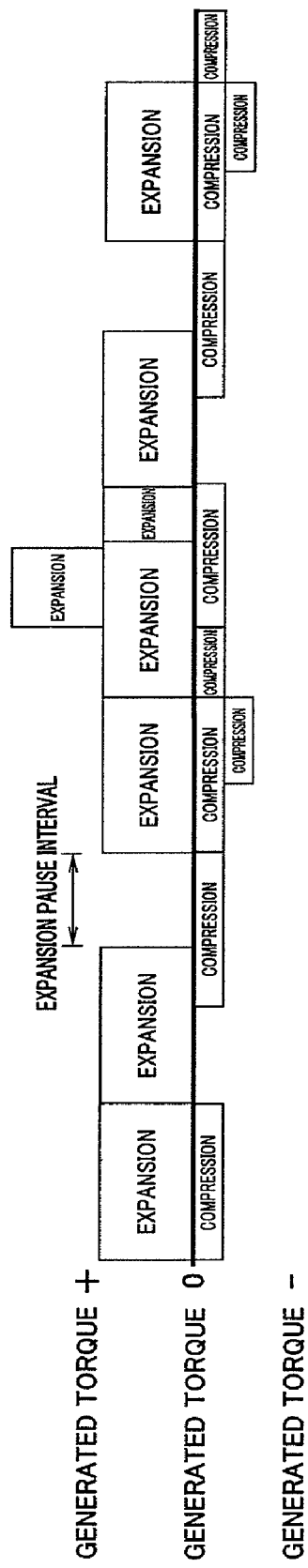
FIG. 21B is a view showing a relationship between generated torques and strokes according to the eighth embodiment.

FIG. 21A is a view showing timings of expansion strokes of a V-type four-cylinder engine which is mounted in a motorcycle of an eighth embodiment and has expansion strokes different from those of FIG. 17A and FIG. 19A. FIG. 21B is a view showing a relationship between generated torques and strokes according to the eighth embodiment. As shown in FIGS. 21A and 21B, the engine of this embodiment is a V-type four-cylinder engine in which the first cylinder and the third cylinder form an open angle of θ (50 degrees to 100 degrees) and the second cylinder and the fourth cylinder form an open angle of θ (50 degrees to 100 degrees). The interval of the crank angle from the expansion stroke of the first cylinder to the expansion stroke of the fourth cylinder is 360 degrees−θ, the interval of the crank angle from the expansion stroke of the fourth cylinder to the expansion stroke of the second cylinder is 180 degrees, the interval of the crank angle from the expansion stroke of the second cylinder to the expansion stroke of the third cylinder is θ, the interval of the crank angle from the expansion stroke of the third cylinder to the expansion stroke of the first cylinder is 180 degrees, and the expansion pause interval in which there are no expansion strokes is provided at interval of crank angle of 180 degrees−θ. In other words, the intervals at which the expansion strokes of the engine occur are set to unequal intervals.

Figure 22A:
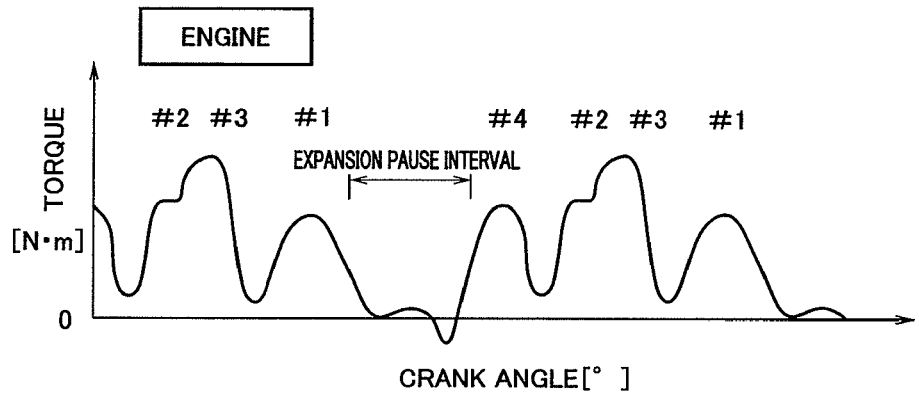
FIG. 22A is a graph showing a relationship between the torque of the engine and the crank angle according to the eighth embodiment.
Figure 22B:
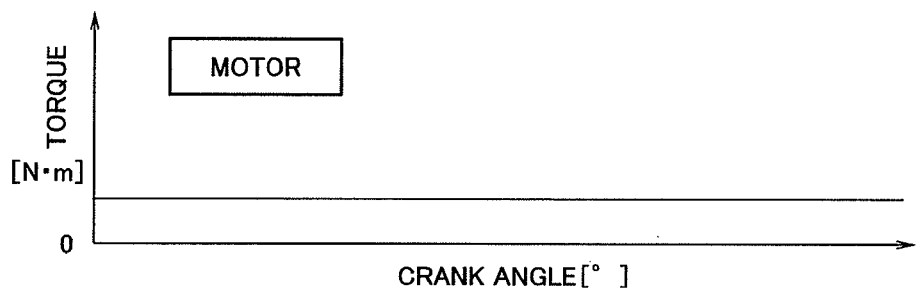
FIG. 22B is a graph showing a relationship between the torque of the motor and the crank angle according to the eighth embodiment.
Figure 22C:
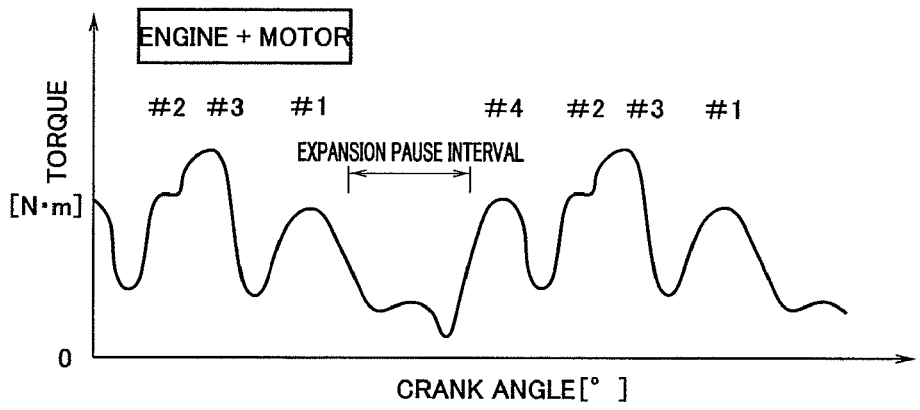
FIG. 22C is a graph showing a relationship between the torque of the engine and the motor, and the crank angle according to the eighth embodiment.

FIG. 22A is a graph showing a relationship between the torque of the engine and the crank angle according to the eighth embodiment. FIG. 22B is a graph showing a relationship between the torque of the motor and the crank angle according to the eighth embodiment. FIG. 22C is a graph showing a relationship between the torque of the engine and the motor, and the crank angle according to the eighth embodiment. As shown in FIG. 21A, the torque of the engine increases in value so as to correspond to the expansion strokes of the respective cylinders, and decreases in compression strokes in the expansion pause interval.

Accordingly, as shown in FIG. 22B, the motor controller 38 (FIG. 2) is configured to execute control so that the motor M (FIG. 2) outputs a predetermined torque according to the throttle operation amount (assist control). Thereby, as shown in FIG. 22C, the torque transmitted to the rear wheel 3 (FIG. 2) is maintained so that a sum of the torque of the engine E (FIG. 2) and the torque of the motor M (FIG. 2) does not have a negative value. The other configuration is identical to that of the first embodiment and will not be further described. Whereas in the eighth embodiment, the motor output is constant, the above described first alternative example and second alternative example may be applied.

Embodiment 9

Figure 23A:
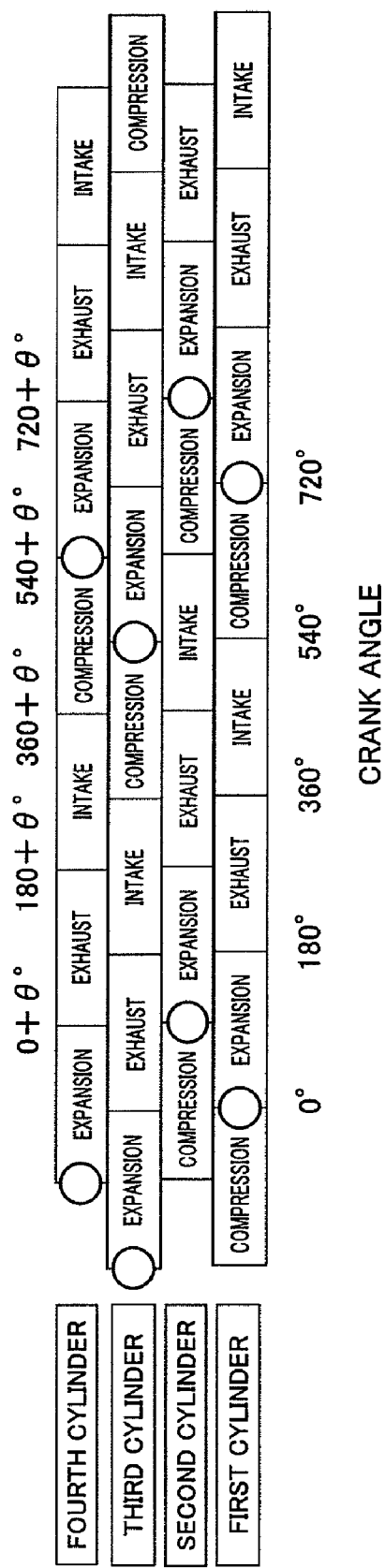
FIG. 23A is a view showing timings of expansion strokes of a V-type four-cylinder engine mounted in a motorcycle according to a ninth embodiment.
Figure 23B:
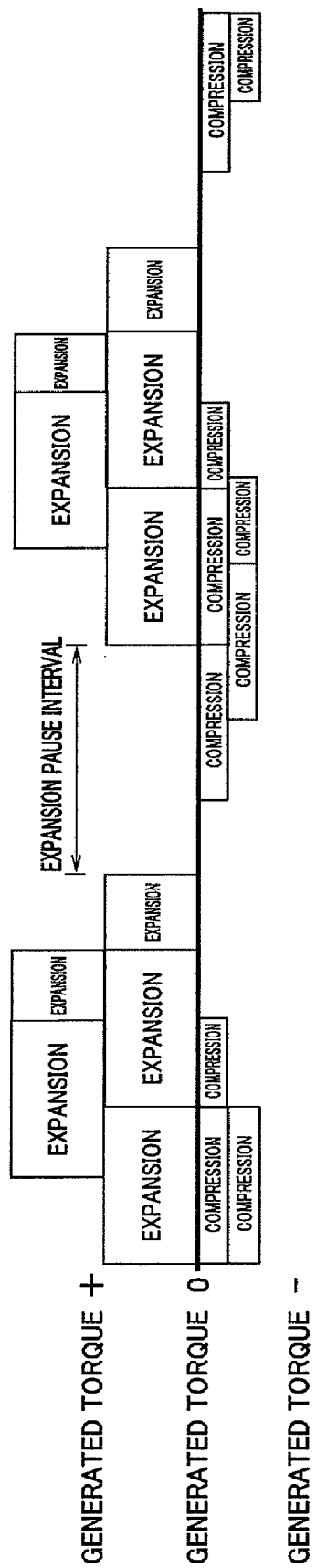
FIG. 23B is a view showing a relationship between generated torques and strokes according to the ninth embodiment.

FIG. 23A is a view showing timings of expansion strokes of a V-type four-cylinder engine mounted in a motorcycle of a ninth embodiment, which are different from the expansion strokes of FIG. 17A, FIG. 19A and FIG. 21A. FIG. 23B is a view showing a relationship between generated torques and strokes according to the ninth embodiment. As shown in FIGS. 23A and 23B, the engine of this embodiment is a V-type four-cylinder engine in which the first cylinder and the third cylinder form therebetween an open angle of θ (50 degrees to 100 degrees), and the second cylinder and the fourth cylinder form therebetween an open angle of θ (50 degrees to 100 degrees). The interval of the crank angle from the expansion stroke of the first cylinder to the expansion stroke of the second cylinder is θ, the interval of the crank angle from the expansion stroke of the second cylinder to the expansion stroke of the third cylinder is 540 degrees+θ, the interval of the crank angle from the expansion stroke of the third cylinder to the expansion stroke of the fourth cylinder is θ, the interval of the crank angle from the expansion stroke of the fourth cylinder to the expansion stroke of the first cylinder is θ, and expansion pause interval in which there are no expansion strokes is provided at interval of crank angle of 360 degrees−θ. In other words, the intervals at which the expansion strokes of the engine occur are set to unequal intervals.

Figure 24A:
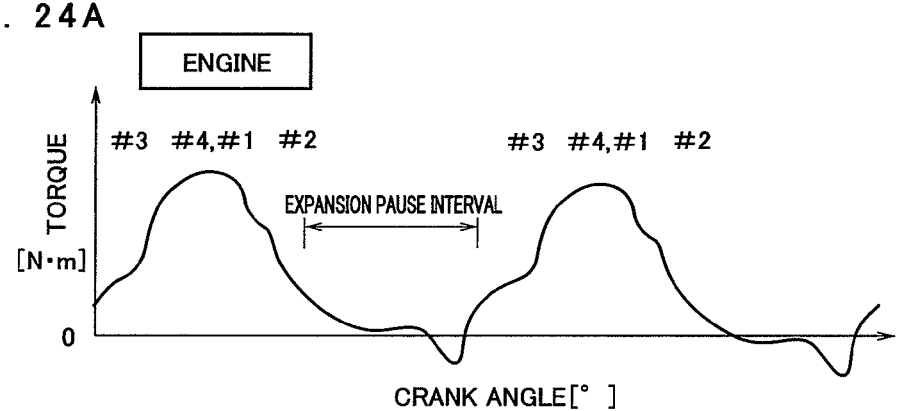
FIG. 24A is a graph showing a relationship between the torque of the engine and the crank angle according to the ninth embodiment.
Figure 24B:
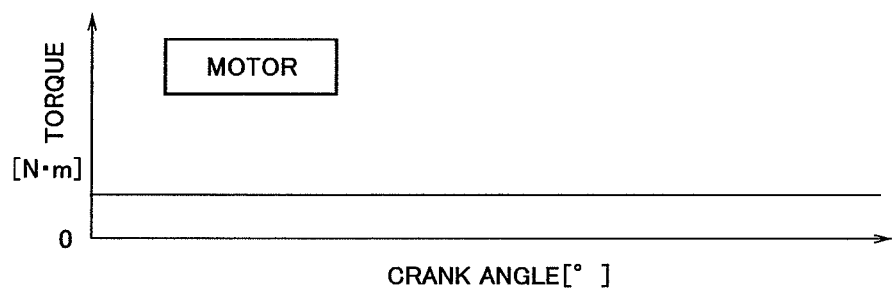
FIG. 24B is a graph showing a relationship between the torque of the motor and the crank angle according to the ninth embodiment.
Figure 24C:
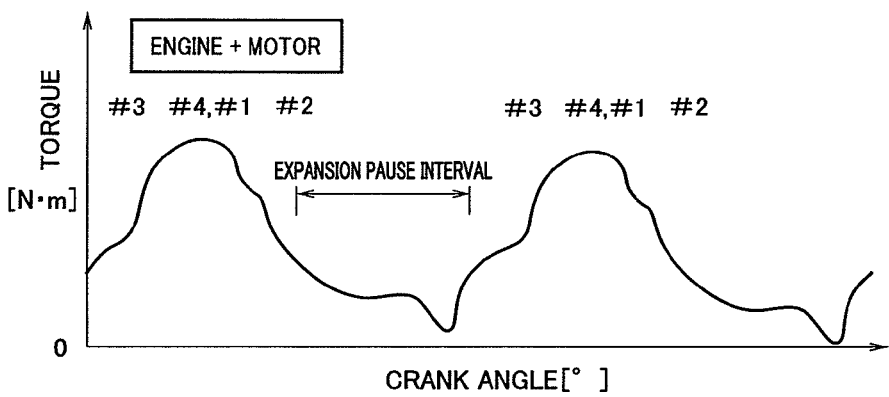
FIG. 24C is a graph showing a relationship between the torque of the engine and the motor, and the crank angle according to the ninth embodiment.

FIG. 24A is a graph showing a relationship between the torque of the engine and the crank angle according to the ninth embodiment. FIG. 24B is a graph showing a relationship between the torque of the motor and the crank angle according to the ninth embodiment. FIG. 24C is a graph showing a relationship between the torque of the engine and the motor, and the crank angle according to the ninth embodiment. As shown in FIG. 24A, the torque of the engine increases in value so as to correspond to the expansion strokes of the respective cylinders, and decreases in compression strokes in the expansion pause interval.

Accordingly, as shown in FIG. 24B, the motor controller 38 (FIG. 2) is configured to execute control so that the motor M (FIG. 2) outputs a predetermined torque according to a throttle operation amount (assist control). Thereby, as shown in FIG. 24C, the torque transmitted to the rear wheel 3 (FIG. 2) is maintained so that a sum of the torque of the engine E (FIG. 2) and the torque of the motor M (FIG. 2) does not have a negative value. The other configuration is identical to that of the first embodiment and will not be further described. Whereas in the ninth embodiment, the motor output is constant, the above described first alternative example and second alternative example may be applied.

Embodiment 10

Figure 25A:
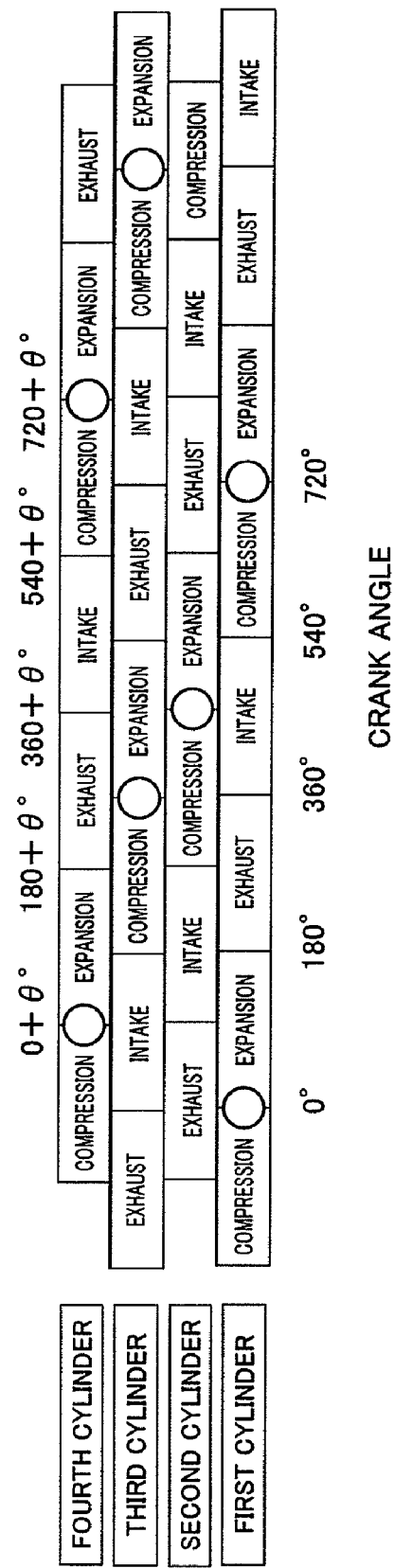
FIG. 25A is a view showing timings of expansion strokes of a V-type four-cylinder engine mounted in a motorcycle according to a tenth embodiment.

FIG. 25A is a view showing timings of expansion strokes of a V-type four-cylinder engine mounted in a motorcycle according to a tenth embodiment, which are different from the expansion strokes of FIG. 17A, FIG. 19A, FIG. 21A and FIG. 23A. FIG. 25B is a view showing a relationship between generated torques and strokes according to the tenth embodiment. As shown in FIGS. 25A and 25B, the engine of this embodiment is a V-type four-cylinder engine in which the first cylinder and the third cylinder form therebetween an open angle of θ (50 degrees to 100 degrees) and the second cylinder and the fourth cylinder form an open angle of θ (50 degrees to 100 degrees). The interval of the crank angle from the expansion stroke of the first cylinder to the expansion stroke of the fourth cylinder is θ, the interval of the crank angle from the expansion stroke of the fourth cylinder to the expansion stroke of the third cylinder is 360 degrees−θ, the interval of the crank angle from the expansion stroke of the third cylinder to the expansion stroke of the second cylinder is θ, the interval of the crank angle from the expansion stroke of the second cylinder to the expansion stroke of the first cylinder is 360 degrees−θ, and the expansion pause interval in which there are no expansion strokes is provided at interval of crank angle of 180 degrees−θ. In other words, the intervals at which the expansion strokes of the engine occur are set to unequal intervals.

Figure 26A:
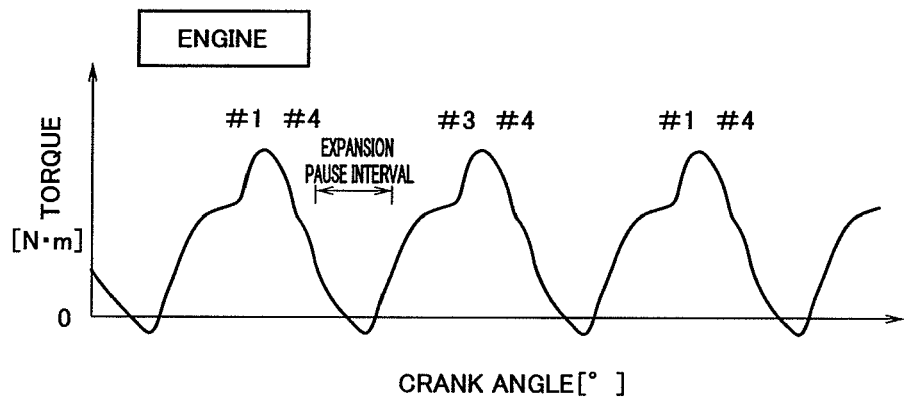
FIG. 26A is a graph showing a relationship between the torque of the engine and the crank angle according to the tenth embodiment.
Figure 26B:
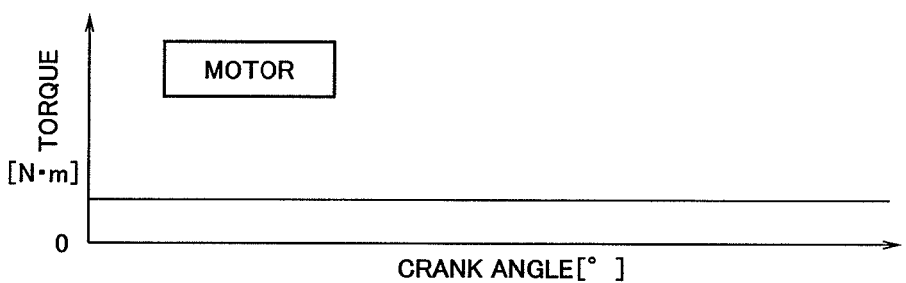
FIG. 26B is a graph showing a relationship between the torque of the motor and the crank angle according to the tenth embodiment.
Figure 26C:
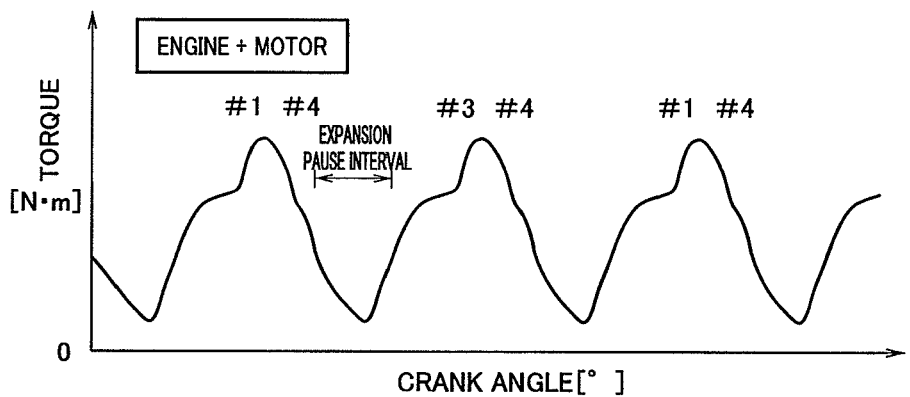
FIG. 26C is a graph showing a relationship between the torque of the engine and the motor, and the crank angle according to the tenth embodiment.

FIG. 26A is a graph showing a relationship between the torque of the engine and the crank angle according to the tenth embodiment. FIG. 26B is a graph showing a relationship between the torque of the motor and the crank angle according to the tenth embodiment. FIG. 26C is a graph showing a relationship between the torque of the engine and the motor, and the crank angle according to the tenth embodiment. As shown in FIG. 26A, the torque of the engine increases in value so as to correspond to the expansion strokes of the respective cylinders, and decreases in compression strokes in the expansion pause interval.

Accordingly, as shown in FIG. 26B, the motor controller 38 (FIG. 2) is configured to execute control so that the motor M (FIG. 2) outputs a predetermined torque according to a throttle operation amount (assist control). Thereby, as shown in FIG. 26C, the torque transmitted to the rear wheel 3 (FIG. 2) is maintained so that a sum of the torque of the engine E (FIG. 2) and the torque of the motor M (FIG. 2) does not have a negative value. The other configuration is identical to that of the first embodiment and will not be further described. Whereas in the tenth embodiment, the motor output is constant, the above described first alternative example and second alternative example may be applied.

Embodiment 11

Figure 27A:
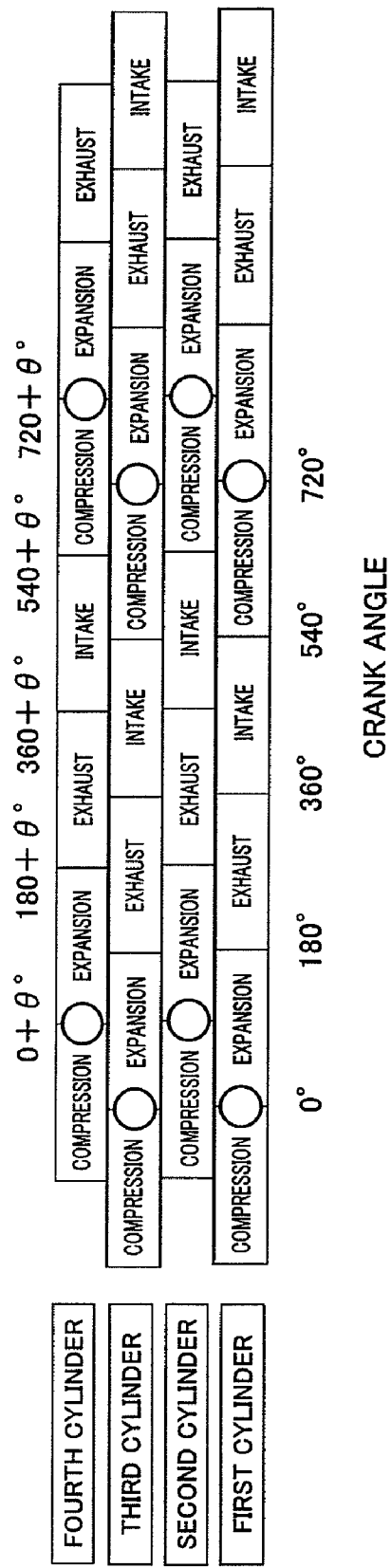
FIG. 27A is a view showing timings of expansion strokes of a V-type four-cylinder engine mounted in a motorcycle according to an eleventh embodiment.
Figure 27B:
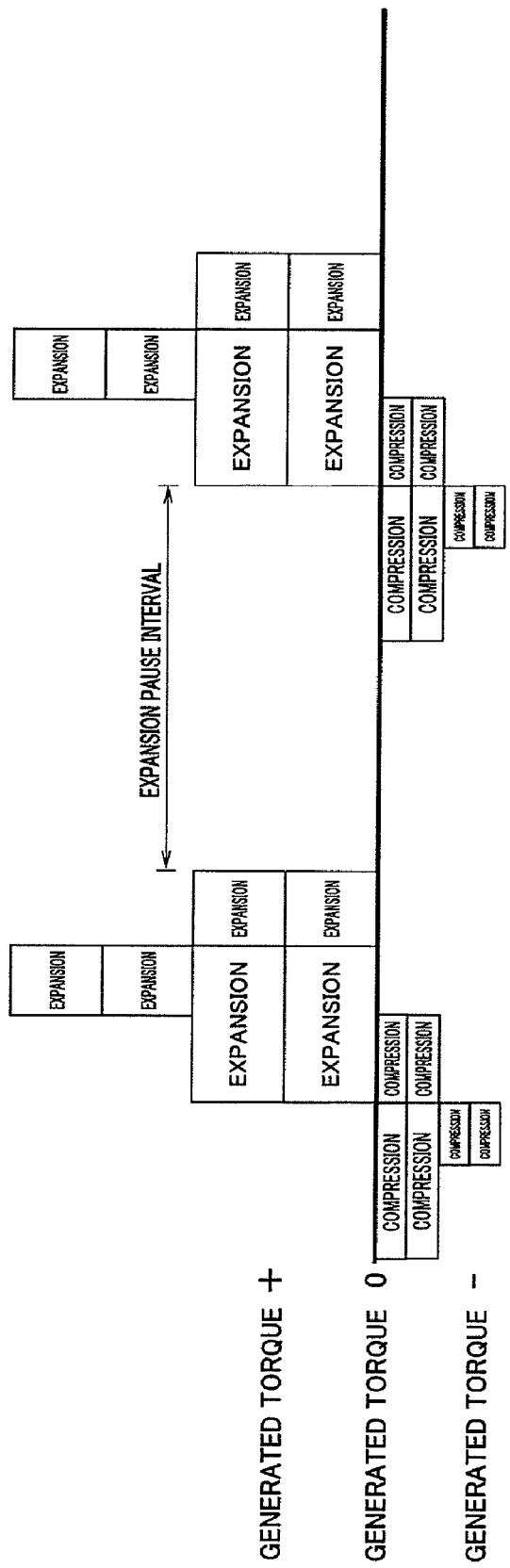
FIG. 27B is a view showing a relationship between generated torques and strokes according to the eleventh embodiment.

FIG. 27A is a view showing timings of expansion strokes of a V-type four-cylinder engine mounted in a motorcycle according to an eleventh embodiment, which are different from the expansion strokes of FIG. 17A, FIG. 19A, FIG. 21A, FIG. 23A, and FIG. 25A. FIG. 27B is a view showing a relationship between generated torques and strokes according to the eleventh embodiment. As shown in FIGS. 27A and 27B, the engine of this embodiment is a V-type four-cylinder engine in which the first cylinder and the third cylinder form therebetween an open angle of θ (50 degrees to 100 degrees) and the second cylinder and the fourth cylinder form an open angle of θ (50 degrees to 100 degrees). The expansion stroke of the first cylinder and the expansion stroke of the third cylinder occur at equal crank angles, and the expansion stroke of the second cylinder and the expansion stroke of the fourth cylinder occur at equal crank angles. The interval of the crank angle from the expansion strokes of the first cylinder and the third cylinder to the expansion strokes of the second cylinder and the fourth cylinder is θ. The expansion pause interval in which there are no expansion strokes is provided at interval of crank angle of 540 degrees−θ. In other words, the intervals at which the expansion strokes of the engine occur are set to unequal intervals.

Figure 28A:
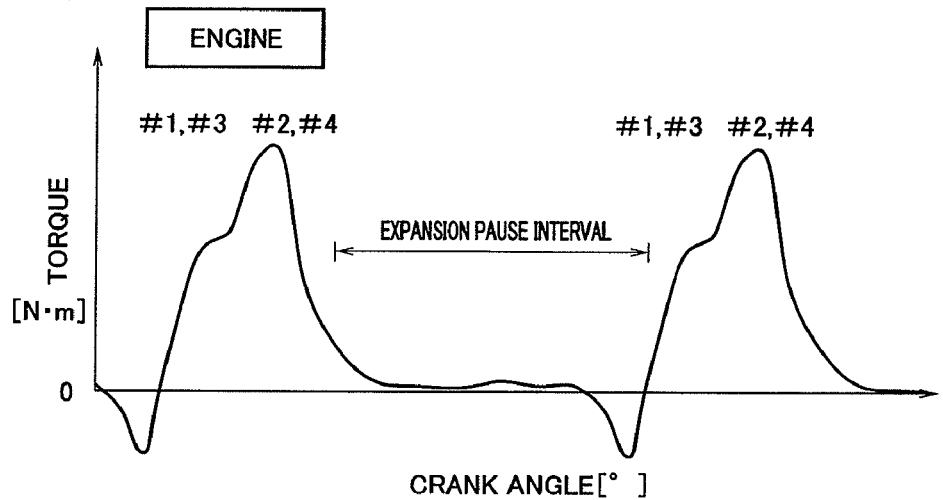
FIG. 28A is a graph showing a relationship between the torque of the engine and the crank angle according to the eleventh embodiment.
Figure 28B:
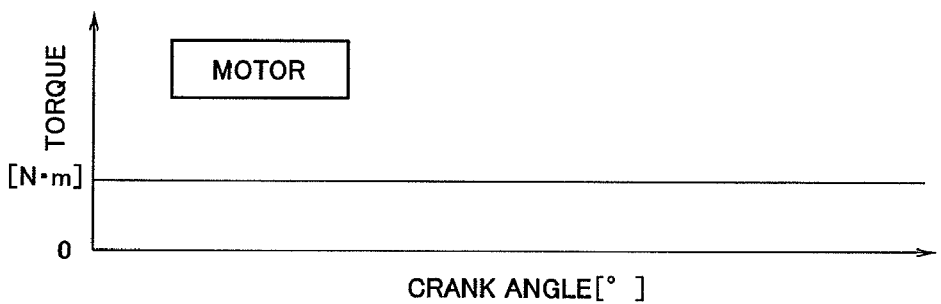
FIG. 28B is a graph showing a relationship between the torque of the motor and the crank angle according to the eleventh embodiment.
Figure 28C:
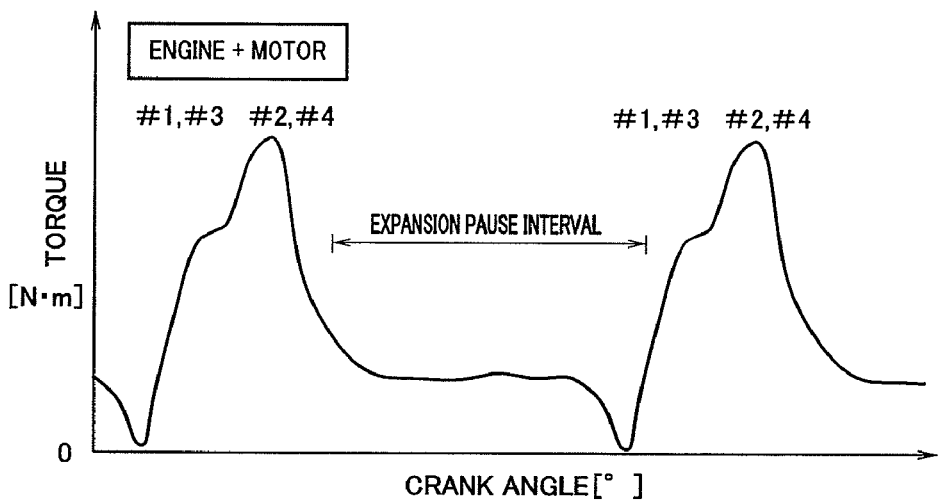
FIG. 28C is a graph showing a relationship between the torque of the engine and the motor, and the crank angle according to the eleventh embodiment.

FIG. 28A is a graph showing a relationship between the torque of the engine and the crank angle according to the eleventh embodiment. FIG. 28B is a graph showing a relationship between the torque of the motor and the crank angle according to the eleventh embodiment. FIG. 28C is a graph showing a relationship between the torque of the engine and the motor, and the crank angle according to the eleventh embodiment. As shown in FIG. 28A, the torque of the engine increases in value so as to correspond to the expansion strokes of the respective cylinders, and decreases in compression strokes in the expansion pause interval.

Accordingly, as shown in FIG. 28B, the motor controller 38 (FIG. 2) is configured to execute control so that the motor M (FIG. 2) outputs a predetermined torque according to a throttle operation amount (assist control). Thereby, as shown in FIG. 28C, the torque transmitted to the rear wheel 3 (FIG. 2) is maintained so that a sum of the torque of the engine E (FIG. 2) and the torque of the motor M (FIG. 2) does not have a negative value. The other configuration is identical to that of the first embodiment and will not be further described. Whereas in the eleventh embodiment, the motor output is constant, the above described first alternative example and second alternative example may be applied.

Embodiment 12

Figure 29A:
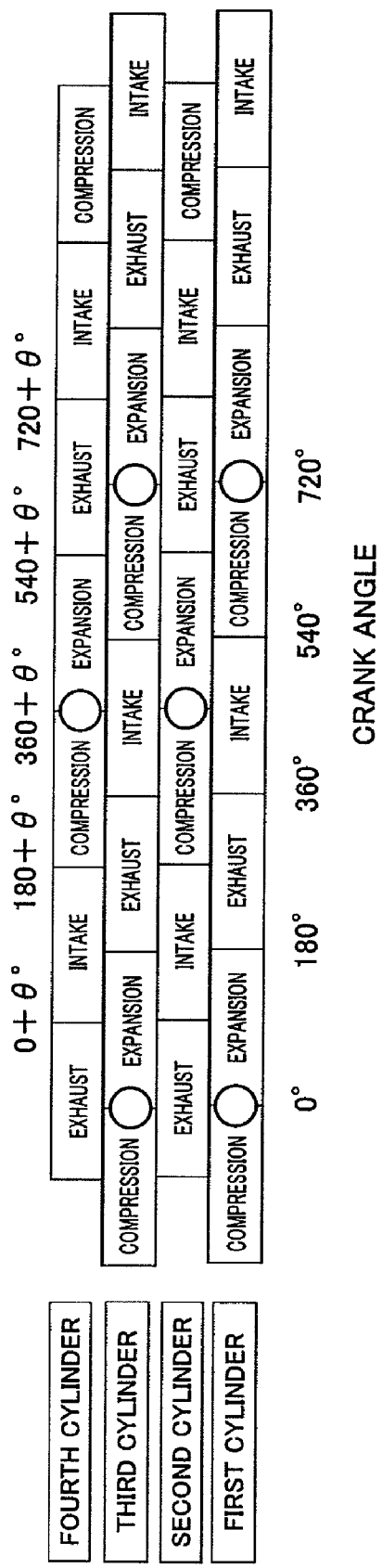
FIG. 29A is a view showing timings of expansion strokes of a V-type four-cylinder engine mounted in a motorcycle according to a twelfth embodiment.

FIG. 29A is a view showing timings of expansion strokes of a V-type four-cylinder engine mounted in a motorcycle according to a twelfth embodiment, which are different from the expansion strokes of FIG. 17A, FIG. 19A, FIG. 21A, FIG. 23A, FIG. 25A, and FIG. 27A. FIG. 29B is a view showing a relationship between generated torques and strokes according to the twelfth embodiment. As shown in FIGS. 29A and 29B, the engine of this embodiment is a V-type four-cylinder engine in which the first cylinder and the third cylinder form therebetween an open angle of θ (50 degrees to 100 degrees), and the second cylinder and the fourth cylinder form an open angle of θ (50 degrees to 100 degrees). The expansion stroke of the first cylinder and the expansion stroke of the third cylinder occur at equal crank angles, and the expansion stroke of the second cylinder and the expansion stroke of the fourth cylinder occur at equal crank angles. The interval of the crank angle from the expansion strokes of the first cylinder and the third cylinder to the expansion strokes of the second cylinder and the fourth cylinder is 360 degrees+θ, the interval of the crank angle from the expansion strokes of the second cylinder and the fourth cylinder to the expansion strokes of the first cylinder and the third cylinders is 360 degrees−θ, and the expansion pause interval in which there are no expansion strokes is provided at interval of crank angle of 540 degrees−θ. In other words, the intervals at which the expansion strokes of the engine occur are set to unequal intervals.

Figure 30A:
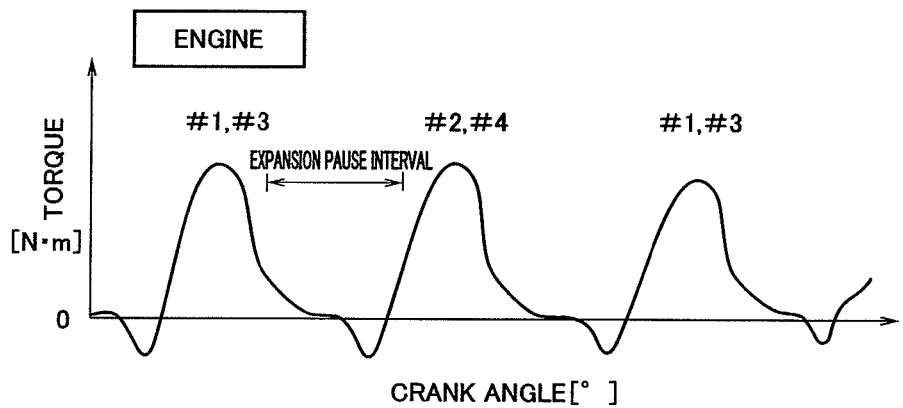
FIG. 30A is a graph showing a relationship between the torque of the engine and the crank angle according to the twelfth embodiment.
Figure 30B:
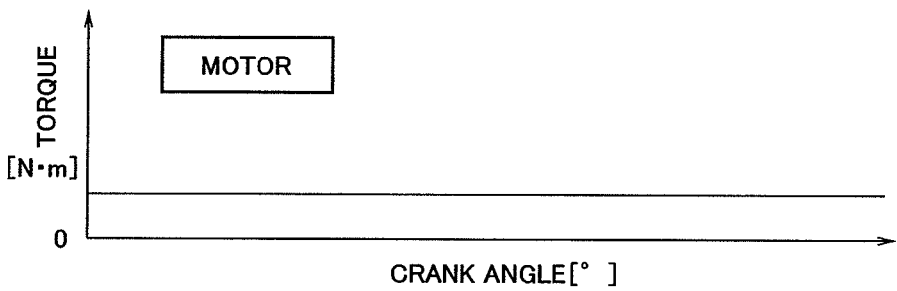
FIG. 30B is a graph showing a relationship between the torque of the motor and the crank angle according to the twelfth embodiment.
Figure 30C:
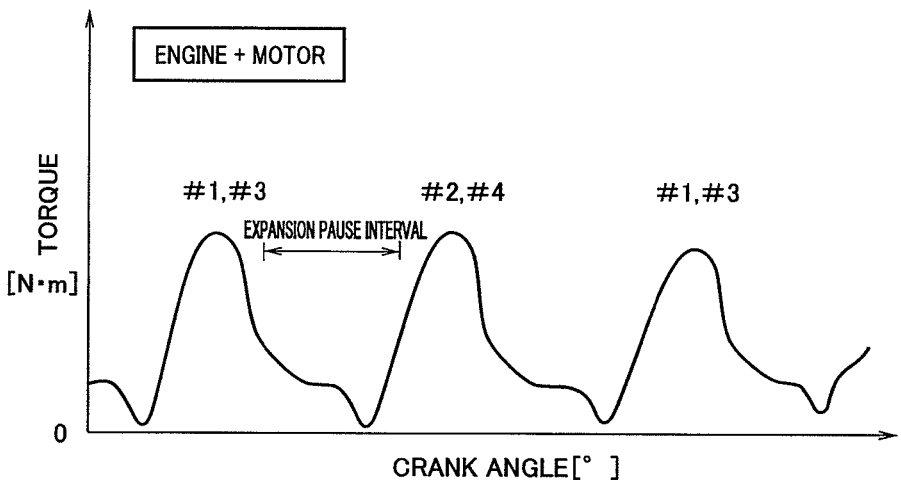
FIG. 30C is a graph showing a relationship between the torque of the engine and the motor, and the crank angle according to the twelfth embodiment.

FIG. 30A is a graph showing a relationship between the torque of the engine and the crank angle according to the twelfth embodiment. FIG. 30B is a graph showing a relationship between the torque of the motor and the crank angle according to the twelfth embodiment. FIG. 30C is a graph showing a relationship between the torque of the engine and the motor, and the crank angle according to the twelfth embodiment. As shown in FIG. 30A, the torque of the engine increases in value so as to correspond to the expansion strokes of the respective cylinders, and decreases in compression strokes in the expansion pause interval.

Accordingly, as shown in FIG. 30B, the motor controller 38 (FIG. 2) is configured to execute control so that the motor M (FIG. 2) outputs a predetermined torque according to a throttle operation amount (assist control). Thereby, as shown in FIG. 30C, the torque transmitted to the rear wheel 3 (FIG. 2) is maintained so that a sum of the torque of the engine E (FIG. 2) and the torque of the motor M (FIG. 2) does not have a negative value. The other configuration is identical to that of the first embodiment and will not be further described. Whereas in the twelfth embodiment, the motor output is constant, the above described first alternative example and second alternative example may be applied.

Embodiment 13

Figure 31A:
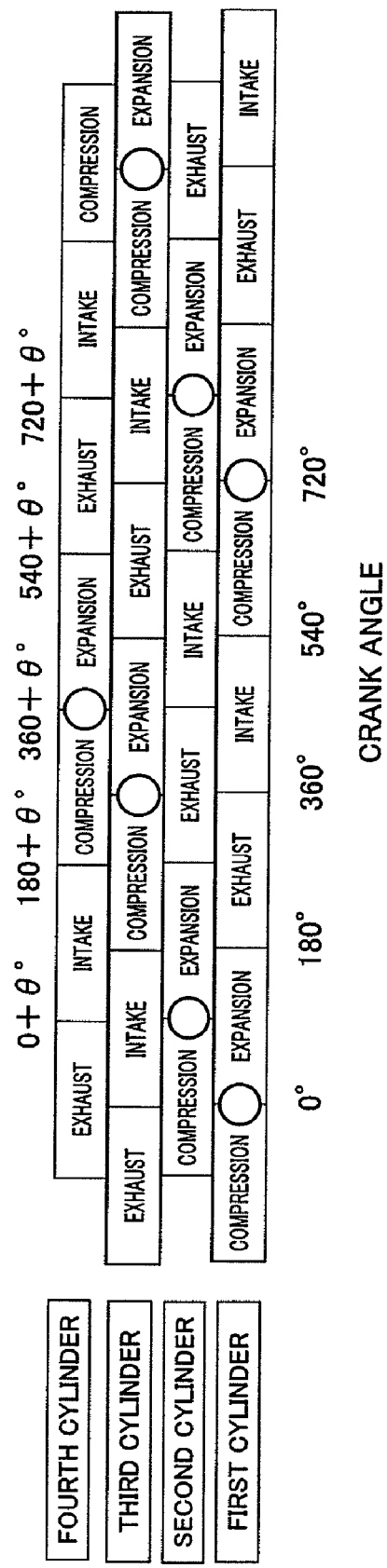
FIG. 31A is a view showing timings of expansion strokes of a V-type four-cylinder engine mounted in a motorcycle according to a thirteenth embodiment.
Figure 31B:
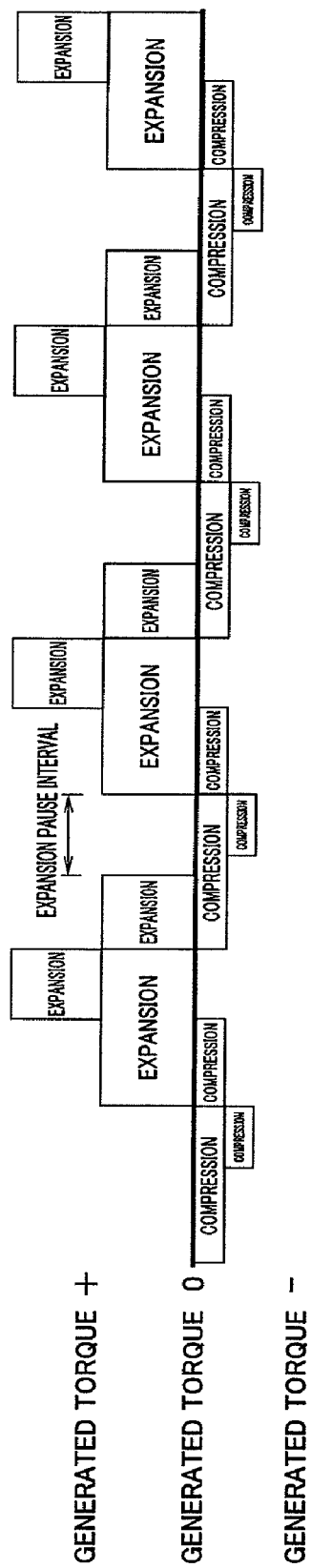
FIG. 31B is a view showing a relationship between generated torques and strokes according to the thirteenth embodiment.

FIG. 31A is a view showing timings of expansion strokes of a V-type four-cylinder engine mounted in a motorcycle according to a thirteenth embodiment, which are different from the expansion strokes of FIG. 17A, FIG. 19A, FIG. 21A, FIG. 23A, FIG. 25A, FIG. 27A, and FIG. 29A. FIG. 31B is a view showing a relationship between generated torques and strokes according to the thirteenth embodiment. As shown in FIGS. 31A and 31B, the engine of this embodiment is a V-type four-cylinder engine in which the first cylinder and the third cylinder form therebetween an open angle of θ (50 degrees to 100 degrees) and the second cylinder and the fourth cylinder form an open angle of θ (50 degrees to 100 degrees). The interval of the crank angle from the expansion stroke of the first cylinder to the expansion stroke of the second cylinder is θ, the interval of the crank angle from the expansion stroke of the second cylinder to the expansion stroke of the third cylinder is 360 degrees−θ, the interval of the crank angle from the expansion stroke of the third cylinder to the expansion stroke of the fourth cylinder is θ, the interval of the crank angle from the expansion stroke of the fourth cylinder to the expansion stroke of the first cylinder is 360 degrees−θ, and the expansion pause interval in which there are no expansion strokes is provided at interval of crank angle of 180 degrees−θ. In other words, the intervals at which the expansion strokes of the engine occur are set to unequal intervals.

Figure 32A:
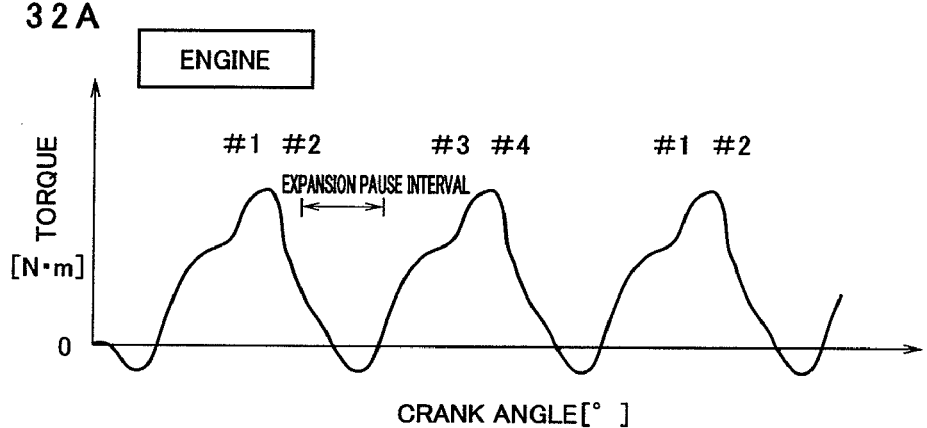
FIG. 32A is a graph showing a relationship between the torque of the engine and the crank angle according to the thirteenth embodiment.
Figure 32B:
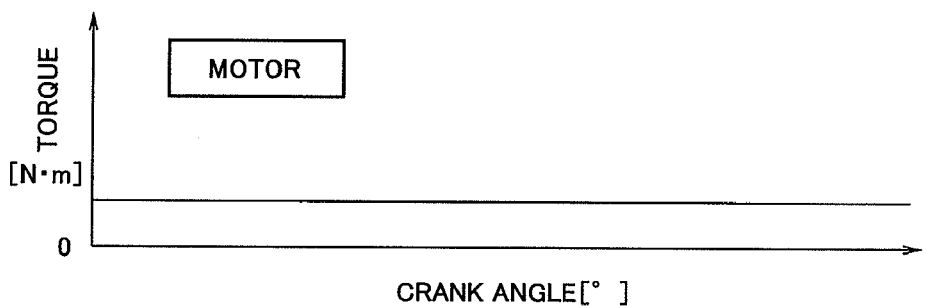
FIG. 32B is a graph showing a relationship between the torque of the motor and the crank angle according to the thirteenth embodiment.
Figure 32C:
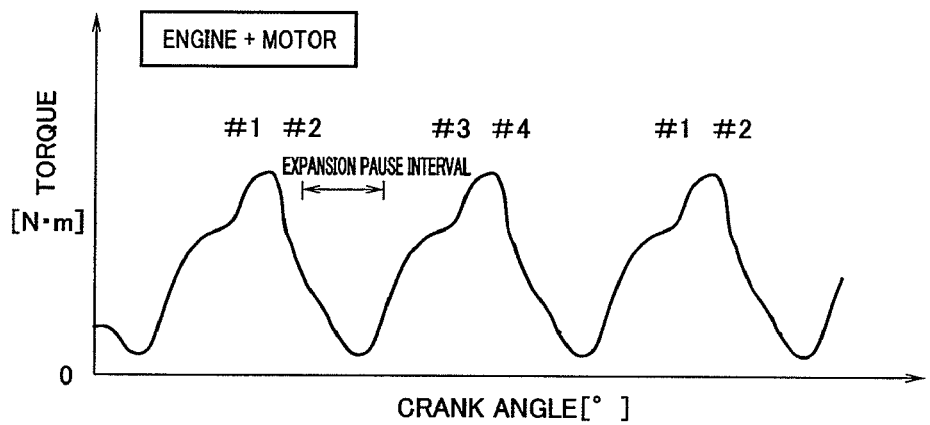
FIG. 32C is a graph showing a relationship between the torque of the engine and the motor, and the crank angle according to the thirteenth embodiment.

FIG. 32A is a graph showing a relationship between the torque of the engine and the crank angle according to the thirteenth embodiment. FIG. 32B is a graph showing a relationship between the torque of the motor and the crank angle according to the thirteenth embodiment. FIG. 32C is a graph showing a relationship between the torque of the engine and the motor, and the crank angle according to the thirteenth embodiment. As shown in FIG. 32A, the torque of the engine increases in value so as to correspond to the expansion strokes of the respective cylinders, and decreases in compression strokes in the expansion pause interval.

Accordingly, as shown in FIG. 32B, the motor controller 38 (FIG. 2) is configured to execute control so that the motor M (FIG. 2) outputs a predetermined torque according to a throttle operation amount (assist control). Thereby, as shown in FIG. 32C, the torque transmitted to the rear wheel 3 (FIG. 2) is maintained so that a sum of the torque of the engine E (FIG. 2) and the torque of the motor M (FIG. 2) does not have a negative value. The other configuration is identical to that of the first embodiment and will not be further described. Whereas in the thirteenth embodiment, the motor output is constant, the above described first alternative example and second alternative example may be applied.

Subsequently, a negative torque of the engine generated in the above described embodiments will be described.

FIG. 33 is a table showing a comparison of the degree with which the negative torque is likely to be generated in the first to thirteenth embodiments. As shown in FIG. 33, the degree with which the negative torque is likely to be generated in various engines configured to expand at unequal intervals are varied depending on their components and configurations. Generally, in cases where the compression stroke occurs simultaneously in a plurality of cylinders, or the expansion pause interval is long, the negative torque is likely to be generated in an engine driving power output. The assist control of the present invention is particularly suitable for the cases where the compression stroke occurs simultaneously in a plurality of cylinders, or the expansion pause interval is long.

Embodiment 14

Figure 34:
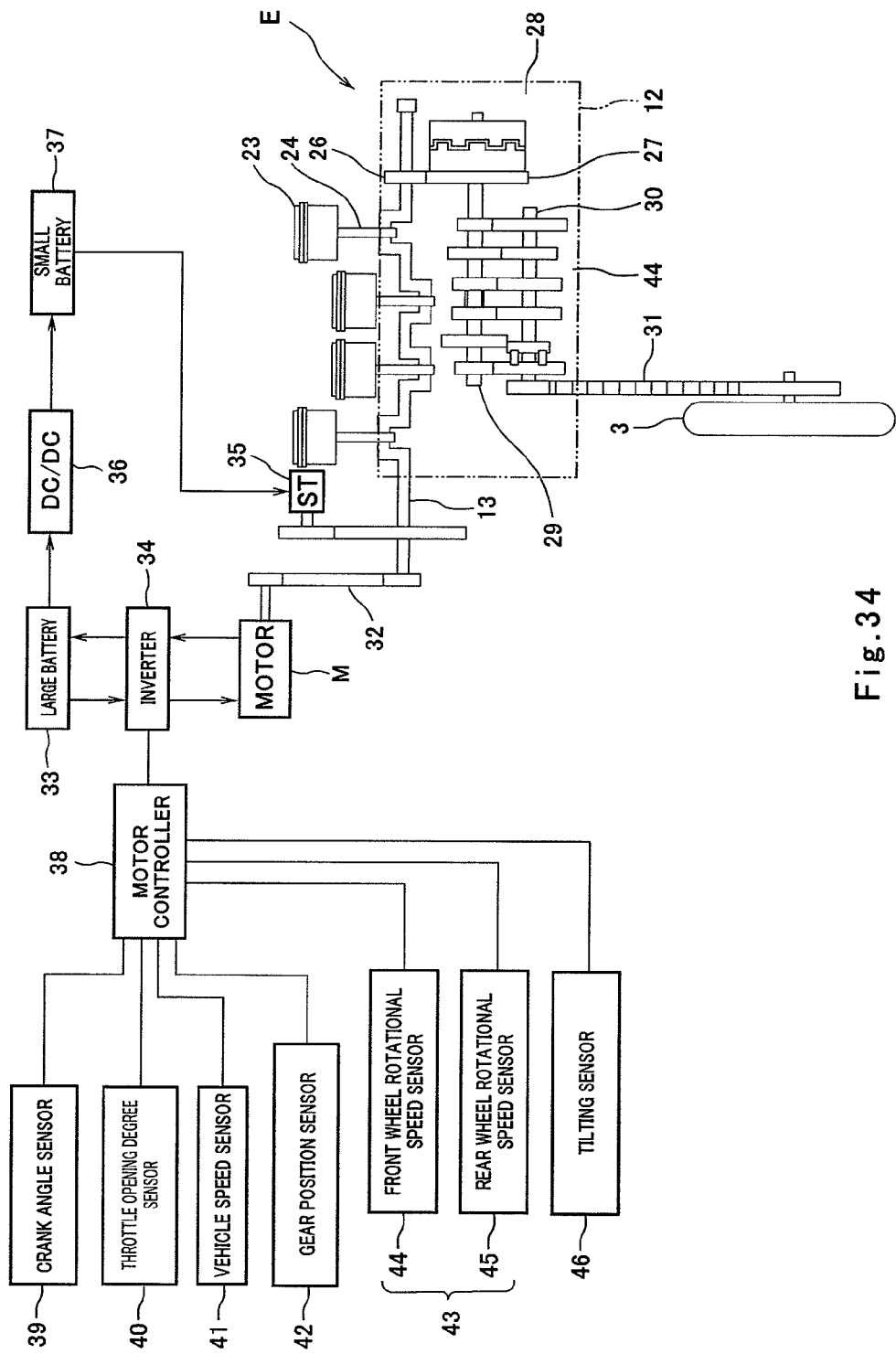
FIG. 34 is a block diagram of the motorcycle according to a fourteenth embodiment.
Figure 35:
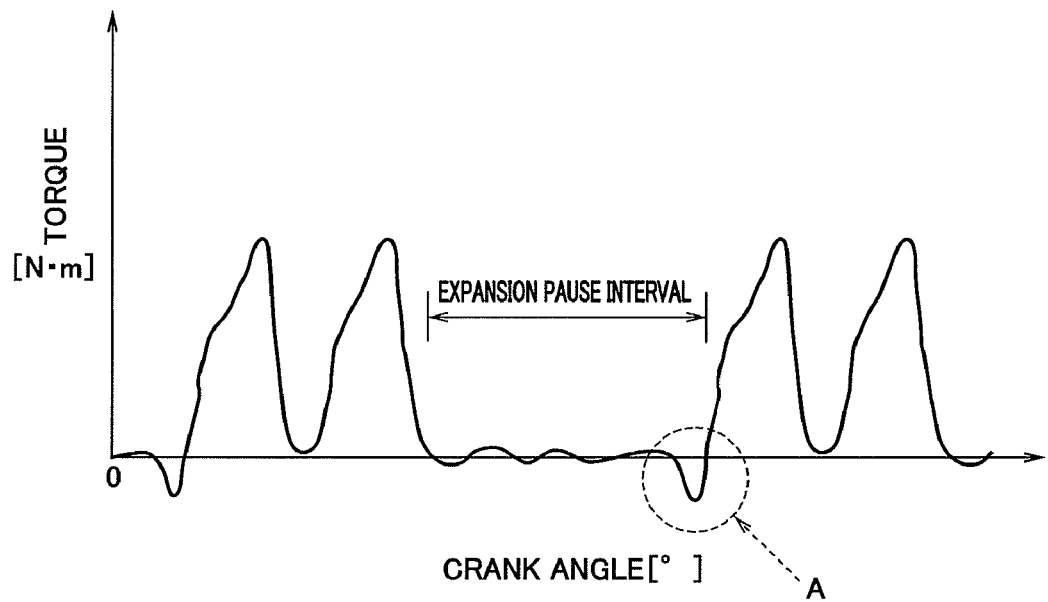
FIG. 35 is a graph showing a relationship between a torque of an engine and a crank angle according to a prior art.

Subsequently, a fourteenth embodiment will be described. FIG. 34 is a block diagram of a motorcycle according to the fourteenth embodiment. As shown FIG. 34, a front wheel rotational speed sensor 44 that detects a rotational speed of the front wheel 2 and a rear wheel rotational speed sensor 45 that detects a rotational speed of the rear wheel 3 are coupled to the motor controller 38, forming a slip detecting device 43. To be specific, the motor controller 38 is configured to determine that the rear wheel 3 which is a drive wheel has slipped on a ground surface, when a difference between the rotational speed detected by the front wheel rotational speed sensor 44 and the rotational speed detected by the rear wheel rotational speed sensor 45 is a predetermined value or larger. In addition, a tilting sensor 46 is coupled to the motor controller 38 to detect that the vehicle body of the motorcycle 1 is tilted a predetermined angle or larger with respect to the driving direction.

The motor controller 38 determines whether or not the rear wheel 3 has slipped on the ground surface based information from the slip detecting device 43. If it is determined that the rear wheel 3 has slipped, the motor controller 38 decreases the torque of the motor M to restore the gripping force of the rear wheel 3 with respect to the ground surface. Furthermore, the motor controller 38 determines whether or not the vehicle body of the motorcycle 1 is tilted the predetermined angle or larger with respect to the driving direction based on the information from the tilting sensor 46. If it is determined that the vehicle body is tilted the predetermined angle or larger, the motor controller 38 decreases the torque of the motor M to maintain the gripping force of the rear wheel 3 with respect to the ground surface. Moreover, this embodiment is applicable to all the above described embodiments.

The invention claimed is:

1. A vehicle comprising:
an engine in which angle intervals of crank angles respectively corresponding to expansion strokes of a plurality of cylinders are unequal;
a motor configured to generate a torque applied to a driving wheel via a driving power transmission system including a crankshaft of the engine;
one or more sensors configured to detect an operational condition of the engine; and
a motor controller configured to drive the motor to add the torque of the motor to a torque of the engine after the engine has started;
wherein the motor controller is configured to drive the motor at least when the torque of the engine is a negative value, and to control the motor so that a sum of the torque of the motor and the torque of the engine is maintained at a positive value.

2. The vehicle according to claim 1, wherein the motor controller is configured to drive the motor when at least one cylinder of the engine is in a compression stroke.

3. The vehicle according to claim 2, wherein the motor controller is configured to cause the motor to output a constant torque according to a throttle operation amount.

4. The vehicle according to claim 2,
wherein the engine is configured such that compression strokes of at least two cylinders occur simultaneously; and
wherein the motor controller is configured to execute control so that the torque of the motor in the compression strokes occurring simultaneously is higher than the torque of the motor in the other strokes.

5. The vehicle according to claim 1, wherein the motor controller is configured to execute control to drive the motor when an engine speed of the engine is a predetermined value or lower.

6. A vehicle comprising:
an engine in which angle intervals of crank angles respectively corresponding to expansion strokes of a plurality of cylinders are unequal;
a motor configured to generate a torque applied to a driving wheel via a driving power transmission system including a crankshaft of the engine;
one or more sensors configured to detect an operational condition of the engine
a motor controller configured to drive the motor to add the torque of the motor to a torque of the engine after the engine has started;
wherein the motor controller is configured to drive the motor when at least one cylinder of the engine is in a compression stroke, and to execute control so that the torque of the motor in the compression stroke in an expansion pause interval in which an angle interval of a crank angle is longest, among the angle intervals of the crank angles of the expansion strokes of the engine, is higher than the torque of the motor in other strokes.

7. A vehicle comprising:
an engine in which angle intervals of crank angles respectively corresponding to expansion strokes of a plurality of cylinders are unequal;
a motor configured to generate a torque applied to a driving wheel via a driving power transmission system including a crankshaft of the engine;
one or more sensors configured to detect an operational condition of the engine;
a motor controller configured to drive the motor to add the torque of the motor to a torque of the engine after the engine has started; and
a slip detecting device configured to detect a slip of a drive wheel with respect to a ground surface;
wherein the motor controller is configured to drive the motor based on the engine operational condition, and to decrease the torque of the motor to be lower than a value before detection of the slip when the slip detecting device detects occurrence of the slip.

8. A vehicle comprising:
an engine in which angle intervals of crank angles respectively corresponding to expansion strokes of a plurality of cylinders are unequal;
a motor configured to generate a torque applied to a driving wheel via a driving power transmission system including a crankshaft of the engine;
one or more sensors configured to detect an operational condition of the engine;
a motor controller configured to drive the motor to add the torque of the motor to a torque of the engine after the engine has started; and
a tilting sensor capable of detecting that the vehicle body is tilted rightward or leftward with respect to a driving direction of the vehicle;

wherein the motor controller is configured to drive the motor based on the engine operational condition, and to decrease the torque of the motor when the tilting sensor detects that the vehicle body is tilted a predetermined angle or larger.

9. A motor controller for a vehicle, which is built into the vehicle comprising:

an engine in which angle intervals of crank angles respectively corresponding to expansion strokes of a plurality of cylinders are unequal; and a motor configured to generate a torque added to a driving wheel via a driving power transmission system including a crankshaft of the engine;

wherein the motor controller is configured to receive a signal from one or more sensors configured to detect an operational condition of the engine, and to execute control to drive the motor to add the torque of the motor to a torque of the engine after the engine has started; and the motor controller is configured to drive the motor at least when the torque of the engine is a negative value, and control the motor so that a sum of the torque of the motor and the torque of the engine is maintained at a positive value.

* * * * *